United States Patent
Brown et al.

(10) Patent No.: US 10,068,489 B2
(45) Date of Patent: Sep. 4, 2018

(54) MANAGING ENERGY DURING FLIGHT OF UNMANNED AERIAL VEHICLES FOR SAFE RETURN TO GROUND

(71) Applicant: Skycatch, Inc., San Francisco, CA (US)

(72) Inventors: Stephan Brown, San Francisco, CA (US); Behrooze Sirang, San Francisco, CA (US)

(73) Assignee: SKYCATCH, INC., San Francisco, CA (US)

( * ) Notice: Subject to any disclaimer, the term of this patent is extended or adjusted under 35 U.S.C. 154(b) by 11 days.

(21) Appl. No.: 15/253,862

(22) Filed: Aug. 31, 2016

(65) Prior Publication Data

US 2018/0061247 A1    Mar. 1, 2018

(51) Int. Cl.
    G08G 5/00     (2006.01)
    B60L 11/18    (2006.01)
    B64C 39/02    (2006.01)

(52) U.S. Cl.
    CPC ........ *G08G 5/0039* (2013.01); *B60L 11/1861* (2013.01); *B64C 39/024* (2013.01); *G08G 5/0069* (2013.01); *B60L 2200/10* (2013.01); *B64C 2201/127* (2013.01)

(58) Field of Classification Search
    CPC .............. G08G 5/0039; B60L 11/1861; B60L 2200/10; B64C 39/024; B64C 2201/127
    See application file for complete search history.

(56) References Cited

U.S. PATENT DOCUMENTS

| | | | |
|---|---|---|---|
| 9,688,403 B2 * | 6/2017 | Winn | B64C 39/024 |
| 2011/0071706 A1 | 3/2011 | Crumm et al. | |
| 2011/0313652 A1 | 12/2011 | Hancock | |
| 2012/0032637 A1 | 2/2012 | Kotooka et al. | |
| 2012/0194346 A1 | 8/2012 | Tsai et al. | |
| 2016/0159472 A1 | 6/2016 | Chan et al. | |

FOREIGN PATENT DOCUMENTS

WO    WO 2018/044935    3/2018

OTHER PUBLICATIONS

Saha et al., "Battery health management system for electric UAVs", 2011 IEEE Aerospace Conference, Mar. 2011, pp. 1-9. (Year: 2011).*

(Continued)

*Primary Examiner* — Todd Melton
(74) *Attorney, Agent, or Firm* — Keller Jolley Preece

(57) ABSTRACT

Systems and methods are disclosed for managing energy of a UAV during flight. In particular, the disclosed systems and methods assist in safely returning a UAV to ground while reducing diversionary time for providing energy to the UAV. In one or more embodiments, the disclosed systems and methods calculate a measure of remaining energy with regard to a UAV flying a mission plan and a measure of landing energy needed to travel to a landing station. The disclosed systems and methods can select a transition point from a mission plan and route leading from the mission plan to the landing station by comparing the calculated measure of remaining energy and the calculated measure of landing energy. Moreover, the disclosed system and methods can modify a mission plan to include the selected transition point and route.

20 Claims, 9 Drawing Sheets

(56) References Cited

OTHER PUBLICATIONS

Kim et al., "On the scheduling of systems of UAVs and fuel service stations for long-term mission fulfillment", Journal of Intelligent & Robotic Systems 70, Apr. 2013, pp. 347-359. (Year: 2013).*
Huisman, "Scheduling the refuelling activities of multiple heterogeneous autonomous mobile robots." Oct. 2014, pp. 33-36. (Year: 2014).*
International Search Report & Written Opinion as received in PCT/US2017/049194 dated Dec. 12, 2017.

* cited by examiner

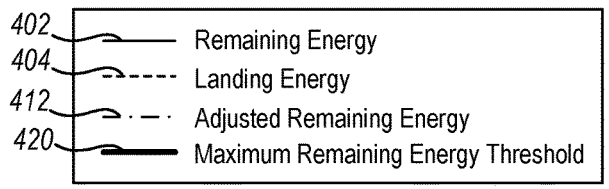
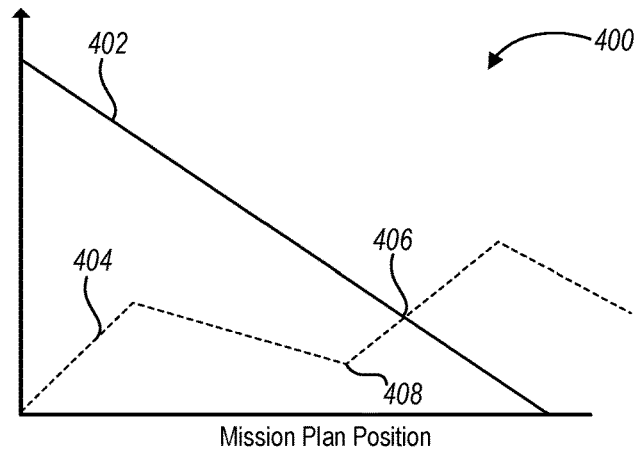
*Fig. 4A*
*Fig. 4B*
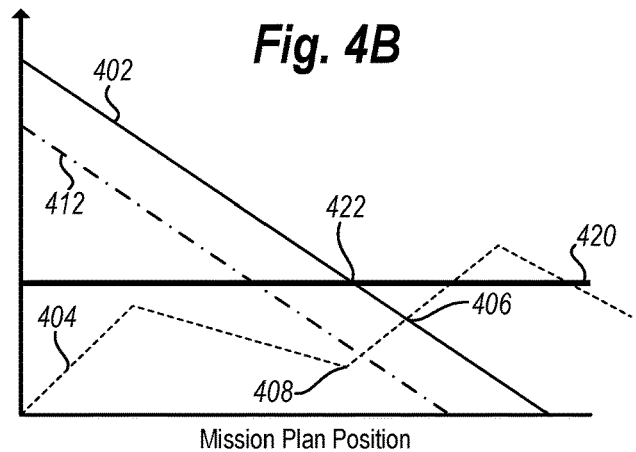
*Fig. 4C*

MANAGING ENERGY DURING FLIGHT OF UNMANNED AERIAL VEHICLES FOR SAFE RETURN TO GROUND

BACKGROUND

1. Technical Field

One or more embodiments of the present disclosure relate generally to managing energy during flight of unmanned aerial vehicles (UAVs). More specifically, one or more embodiments of the present disclosure relate to systems and methods for managing battery energy of UAVs during flight to assist in a safe and efficient return to ground.

2. Background and Relevant Art

Individuals and businesses increasingly utilize UAVs to perform a variety of tasks. Indeed, because of the reduced cost of UAVs relative to chartering traditional manned aerial vehicles, businesses and individuals can engage in a variety of activities that were traditionally cost-prohibitive. For example, businesses increasingly utilize UAVs to capture digital aerial images. In particular, businesses turn to UAVs to take digital aerial images of various sites in construction, land management, mining, or other applications.

Maintaining power for a UAV during flight is a common problem in performing typical activities, such as capturing digital aerial images. Indeed, the longer and more complex the flight, the more difficult it can be to provide sufficient power to systems that maintain flight. For example, a UAV traversing a large site capturing digital aerial images can exhaust battery power before traversing the entire site and completing a mission plan. A UAV that exhausts its battery power during flight can cause damage to people, objects, and/or the UAV itself. Thus, many conventional UAV power systems monitor battery power during flight to avoid a loss of flight capabilities during a mission.

For example, some conventional systems monitor battery voltage, and when the voltage falls below a predetermined threshold, the conventional systems suggest landing (i.e., provide a low battery notification to an operator of the UAV). Although such conventional systems can aid in avoiding loss of power during flight, they have a number of shortcomings. For example, if a UAV is executing a long mission plan, the UAV may not have sufficient battery power to return to a desired landing point. In addition, conventional systems often waste flight time by landing too early, even though the battery associated with the UAV could have continued flight for some additional amount of time. Furthermore, conventional systems that rely on a voltage threshold often travel excessive distances to a landing station. Indeed, because conventional systems return to the ground based on a particular voltage level, they often travel large distances to and from a landing station to maintain energy.

Accordingly, a number of problems and disadvantages exist with conventional systems for managing power of a UAV during flight.

BRIEF SUMMARY

Embodiments of the present disclosure provide benefits and/or solve one or more of the foregoing or other problems in the art with systems and methods for managing UAV energy during flight. For example, in one or more embodiments, systems and methods modify a mission plan to return to ground, based on energy remaining to operate the UAV in flight. In particular, in one or more embodiments, the disclosed systems and methods compare energy remaining to operate a UAV in flight with energy required to travel to a landing site. Moreover, in one or more embodiments, the disclosed systems and methods select a transition point and a route to the landing site based on the comparison between the energy remaining and the energy required to land.

For example, in one or more embodiments, the disclosed systems and methods estimate, during flight of a mission plan of a UAV, a measure of remaining energy with regard to a battery powering the UAV. Moreover, the disclosed systems and methods calculate a measure of landing energy, the measure of landing energy reflecting energy required to travel from a position of the UAV to a landing station. Based on the comparison of the remaining battery time and the travel time, the disclosed systems and methods dynamically modify the mission plan of the UAV.

By calculating a measure of remaining energy and a measure of landing energy, the disclosed systems and methods increase flight time and efficiency while reducing the risk of losing power during flight. Indeed, the disclosed systems and methods can determine a transition point (i.e., a position and/or time for a UAV to travel toward a landing station), such that the UAV will have sufficient power to navigate to the landing station. Moreover, the disclosed systems and methods can select a transition point and route, such that the UAV does not prematurely return to the landing station with excessive power remaining that could have been used to continue flight. In this manner, the disclosed systems and methods can reduce the amount of wasted energy that could have been used to extend a mission plan, and, thus, reduce the number of diversions from a mission plan for purposes of obtaining additional energy.

In addition to reducing the number of diversions while maintaining sufficient energy, the disclosed systems and methods can also select a transition point and route to the landing station based on the measure of landing energy required to navigate the landing station. In particular, the disclosed systems and methods can select a route that minimizes the amount of time required to travel to and from the landing station. Thus, the disclosed systems and methods not only reduce the risk of losing power while increasing the flight time between charges, the disclosed systems and methods can also reduce the time required to fly to a landing station for recharging (or replacing) a low battery.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which:

FIG. 4A illustrates a graph of a calculated measure of remaining energy and a calculated measure of landing energy over various positions in a mission plan in accordance with one or more embodiments;

FIG. 4B illustrates a graph of a calculated measure of remaining energy, a calculated measure of landing energy, and an adjusted measure of remaining energy over various positions in a mission plan in accordance with one or more embodiments in accordance with one or more embodiments;

FIG. 4C illustrates a graph of a calculated measure of remaining energy, a calculated measure of landing energy, and a minimum remaining battery threshold in accordance with one or more embodiments;

DETAILED DESCRIPTION

Figure 1:
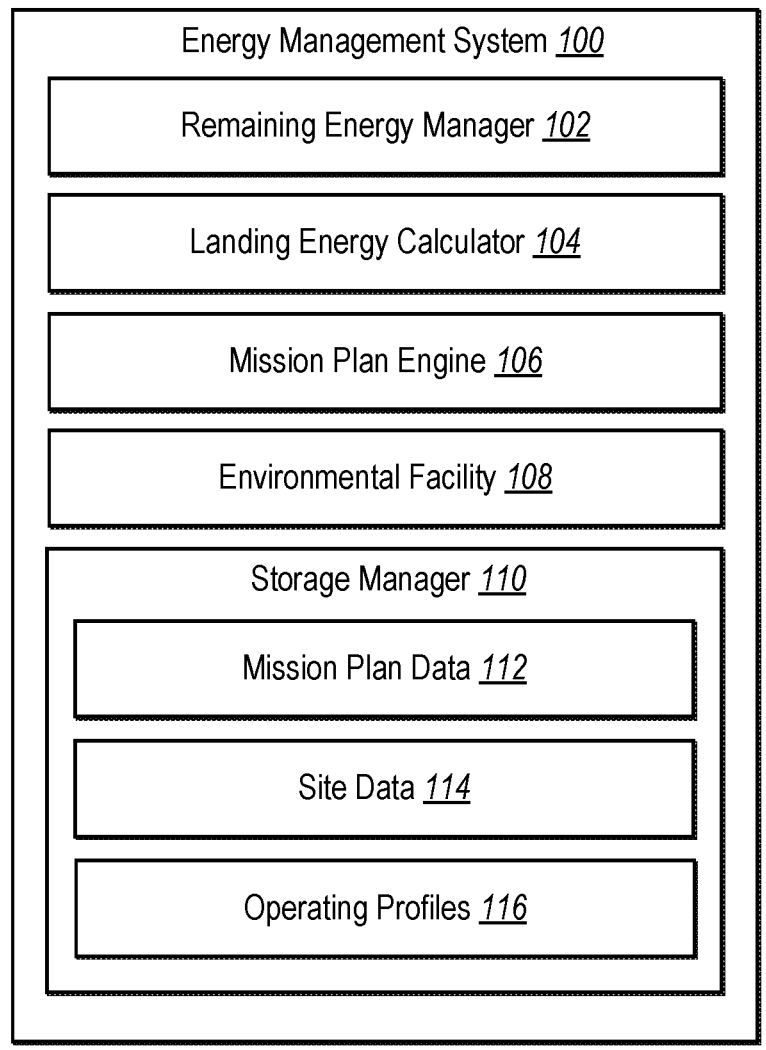
FIG. 1 illustrates a schematic diagram of an energy management system in accordance with one or more embodiments.

The present disclosure includes various embodiments and features of an energy management system and corresponding processes that assist in returning a UAV in flight efficiently and safely to the ground. In particular, in one or more embodiments the energy management system monitors energy remaining to operate a UAV and monitors energy needed to travel to one or more landing locations. Moreover, in one or more embodiments, the energy management system generates routes to the landing station based on the remaining energy and landing energy, and modifies a mission plan based on the generated routes.

For example, in one or more embodiments the energy management system estimates, during flight of a mission plan of a UAV, a measure of remaining energy with regard to a battery powering the UAV. The energy management system also calculates a measure of landing energy reflecting the energy needed by the UAV to travel from a position within the mission plan to a landing station. Moreover, the energy management system compares the measure of remaining energy and the measure of landing energy, and, based on the comparison of the remaining battery time and the travel time, dynamically modifies the mission plan of the UAV.

By modifying a mission plan based on a measure of remaining energy and a measure of landing energy, the energy management system can reduce the amount of diversionary time spent to obtain power for the UAV. Moreover, the energy management system can ensure, with greater accuracy, that the UAV maintains sufficient power during flight. In addition, the energy management system can plan routes that reduce the amount of time traveling to and from landing points (i.e., landing stations).

As described in further detail below, the energy management system can utilize a variety of measures of energy to perform its functions. For example, in one or more embodiments, the energy management system calculates a remaining battery time and one or more travelling times. Moreover, the energy management system can compare the remaining battery time and the one or more travelling times to identify transition points (e.g., points in the mission plan where the energy management system travels toward a landing station). Similarly, in addition to time, the energy management system can utilize other measurements of energy, including voltage, power, current, or other measurements.

As just mentioned, in one or more embodiments the energy management system calculates a remaining battery time with regard to a battery powering the UAV. The energy management system can calculate the remaining battery time based on a variety of factors. For example, the energy management system can calculate a discharge rate of the battery (and/or a charging rate, for example, in the case of a solar charging battery) and utilize the discharge rate (and/or charging rate) to estimate the remaining battery time. Similarly, the energy management system can identify one or more environmental conditions (e.g., wind or temperature) and utilize the environmental conditions to estimate the remaining battery time. Moreover, in one or more embodiments, the energy management system monitors the life-cycle of a battery over time and estimates the remaining battery time based on the monitored life-cycle.

As mentioned, the energy management system can account for environmental conditions in estimating a measure of remaining energy (such as remaining battery time). The energy management system can account for environmental factors utilizing a variety of approaches. For example, in one or more embodiments, the energy management system measures the amount of energy utilized over a period of time by a UAV. The energy management system can compare the amount of energy utilized over the period of time to an operating profile of the UAV. Based on the comparison, the energy management system can estimate an amount of energy due to environmental factors. For example, the energy management system can determine that the UAV is utilizing less energy in comparison to the operating profile, and determine an amount of tail wind corresponding to the reduction in energy consumption. The energy management system can then anticipate a head wind (and a corresponding increase in energy consumption) at later stages of a mission plan heading in a different direction.

In addition to utilizing an operating profile, the energy management system can also account for external environmental factors utilizing other techniques. For example, in one or more embodiments, the energy management system measures environmental factors (e.g., temperature, wind speed, or wind direction) utilizing one or more sensors on board the UAV and/or on the ground. Similarly, in one or more embodiments, the energy management system obtains environmental factors from a third-party, such as a remote server that stores weather information.

In one more embodiments, the energy management system dynamically estimates a measure of remaining energy over the course of a mission plan. In particular, the energy management system can estimate remaining battery time at one or more future points during a mission plan. For example, while flying a first flight leg of a mission plan, the energy management system can estimate a measure of remaining energy that will be present during a second flight leg of the mission plan. Thus, the energy management system can estimate a measure of remaining energy with regard to one or more potential transition points as part of selecting a transition point and/or route for traveling to a landing station.

As mentioned above, the energy management system can also estimate one or more measures of landing energy (e.g., travel times). For example, the energy management system can estimate a measure of landing energy reflecting energy needed to travel between a current position of a UAV flying a mission plan and a landing station. Similarly, the energy management system can estimate a measure of landing energy that reflects energy needed to travel between one or more potential transition points and a landing station.

In calculating a measure of landing energy, in one or more embodiments, the energy management system also calculates one or more routes. For example, the energy management system can calculate a route between a current position of UAV flying a mission plan and a landing station. The energy management system can also calculate one or more potential routes between a plurality of potential transition points and a landing station. Upon identifying a potential route between a potential transition point and a landing station, the energy management system can calculate a measure of landing energy needed by the UAV to traverse the route.

The energy management system can account for a variety of factors in calculating a measure of landing energy. For example, the energy management system can account for distance along a route, environmental conditions along a route, changes in elevation along a route, or obstacles along a route in calculating a measure of landing energy. Similarly, the energy management system can account for a measure of landing energy in changing altitude (i.e., ascending or descending), changing direction, landing, and otherwise performing navigation operations to travel along a route to a landing station.

In addition, the energy management system can calculate a measure of landing energy with regard to a variety of positions or destinations. For example, the energy management system can dynamically calculate a measure of landing energy for a variety of potential transition points along a mission plan. Similarly, the energy management system can calculate a measure of landing energy from a potential transition point to two or more different landing stations. In one or more embodiments, the energy management system calculates a measure of landing energy for a plurality of positions along a mission plan to a plurality of different landing stations. In this manner, the energy management system can select a transition point and/or route to the landing station associated with the smallest measure of landing energy and/or the smallest measure of remaining energy that will safely return the UAV to ground.

The energy management system can select a transition point and/or route to return to ground by comparing different measures of energy. For example, the energy management system can calculate a measure of landing energy with regard to a plurality of potential transition points along a mission plan and identify the potential transition points and/or routes corresponding to the least amount of landing energy (e.g., the least amount of travel time or the smallest distance). In this manner, the energy management system can reduce the amount of time and energy required to divert the UAV to a landing station.

As mentioned above, the energy management system can also compare one or more measures of landing energy with one or more measures of remaining energy. For example, the energy management system can identify a transition point based on a comparison between a measure of landing energy and a measure of remaining energy. In particular, in one or more embodiments, the energy management system dynamically forecasts a measure of landing energy and a measure of remaining energy over the course of a remaining mission plan and determines an intersection where the measure of landing energy and the measure of remaining energy will be equal. Based on the determined intersection where the measure of remaining energy equals the measure of landing energy, the energy management system can identify a transition point and route to the landing station. By selecting a transition point based on a position where the measure of remaining energy equals the measure of landing energy, the energy management system can avoid prematurely diverting from a mission plan while reserving sufficient energy for a safe return to ground.

To further reduce the risk of damage, in one or more embodiments, the energy management system utilizes a safety factor to ensure that a UAV will not exhaust all of its energy before returning to a landing station. The safety factor can take a variety of forms. For example, in one or more embodiments, the energy management system subtracts a predetermined measure of energy from the measure of remaining energy as a safety factor. In other embodiments, the energy management system adds a predetermined amount of energy to the measure of landing energy as a safety factor. In yet other embodiments, the energy management system identifies a point in time where the remaining battery time will equal the travel time and travels back to the landing station a predetermined number of minutes before the identified point in time.

Similarly, the energy management system can operate so as to avoid breaking up flight legs or other portions of a mission plan. For example, the energy management system can determine during a first flight leg of a mission plan that a UAV will need to travel to a landing station during a second flight leg (e.g., determine the need for a transition point during a second flight leg). In order to avoid breaking up the second flight leg, the energy management system can travel to the landing station before the second flight leg begins (e.g., modify the transition point so that it occurs prior the second flight leg). In this manner, the energy management system can identify transition points that avoid breaking up flight legs within a mission plan.

As used herein, the term "mission plan" refers to a plan for traversing a target site utilizing a UAV. A mission plan can include both location and altitude data for traversing a target site. A mission plan can include a plan for flying to and from a base location (such as a landing station) in traversing a target site. A mission plan can also include a plan for splitting up a flight based on a measure of remaining energy or any other factors affecting flight of a UAV.

Moreover, as used herein, the term "flight legs" refers to a portion of a mission plan. In particular, the term flight legs includes a straight portion of a mission plan (i.e., a portion without a change in direction). For instance, the term flight legs includes parallel portions of a flight path within a mission boundary, the portions arranged at a flight angle and separated by a leg spacing.

In addition, as used herein, the term "measure of energy" refers to any unit reflecting an amount or degree of a capacity for work. In particular, the term "measure of energy" includes a unit reflecting a capacity for providing electrical power for flight of a UAV. The term "measure of energy" can be reflected in a variety of units, including units of work (e.g., Joules), power (e.g., Watts), voltage (e.g., Volts), current (e.g., Amps), time of flight (e.g., minutes), or some other unit reflecting an amount of work.

Thus, as used herein, the term "measure of remaining energy" refers to a measure of energy present in a power source. In particular, the term "measure of remaining energy" includes a measure of energy present in a battery operating a UAV (e.g., Watts, Volts, or flight time remaining in a battery). Accordingly, the term "measure of remaining energy" includes a remaining battery time with regard to a battery powering the UAV.

Similarly, as used herein, the term "measure of landing energy" refers to a measure of energy needed to travel from one point to another. In particular, the term "measure of landing energy" includes a measure of energy (e.g., Watts, Volts, or travel time) needed for a UAV fly to from a first point to another point. More specifically, the term "measure of landing energy" includes a measure of energy needed for a UAV to fly from a transition point and land at a landing station.

As used herein, the term "landing station" refers to any location for landing a UAV. In particular, the term "landing station" can include one or more pre-designated areas for landing a UAV. Similarly, the term "landing station" can include an apparatus, device, system, or object utilized to assist in landing a UAV. For example, the term "landing station" can include an apparatus utilized to catch, receive, or dock with a UAV. A landing station can be the same location that a UAV takes off from or a different location.

As used herein, the term "transition point" refers to a point where a UAV begins to travel toward a landing station. In particular, the term "transition point" includes a point where a UAV departs from an existing mission plan (e.g., a flight leg of a mission plan) and begins to travel a route toward a landing station. A transition point can comprise a point in time and/or a point in space. For example, a transition point can comprise a particular position along an existing mission plan where a UAV departs from the existing mission plan and travels toward a landing station. Similarly, a transition point can comprise a particular point in time in flying an existing mission plan that a UAV departs from the existing mission plan and travels toward a landing station. Accordingly, as used herein, the term "potential transition point" refers a point along a mission plan where a UAV could begin to travel toward a landing station.

As used herein, the term "mission boundary" refers to a border of a flight area with regard to a target site. The mission boundary can be user-provided and/or generated based on user input and other data. In some embodiments, the term mission boundary may represent a border defining a permissible area in which a UAV is permitted to fly. For instance, the term mission boundary includes a border defining an area in which a UAV is permitted to fly to capture one or more digital aerial images. The term mission boundary also includes a border between a permissible area in which a UAV is permitted to fly and one or more impermissible areas in which a UAV is not permitted to fly, or in which flying the UAV is undesirable or dangerous.

As used herein, the term "target site" refers to a location on Earth. In particular, the term target site includes a location on Earth that a user seeks to capture in a plurality of digital aerial images. The term target site can include a construction site, a mining site, a particular property, a wilderness area, a disaster area, or other location.

Turning now to FIG. 1, additional detail will be provided regarding components and capabilities of one or more embodiments of the energy management system. In particular, FIG. 1 shows a schematic diagram illustrating an example embodiment of an energy management system 100. As shown in FIG. 1, in one or more embodiments, the energy management system 100 includes a remaining energy manager 102, a landing energy calculator 104, a mission plan engine 106, an environmental facility 108, and a storage manager 110. Moreover, the storage manager 110 may also include, as shown, mission plan data 112, site data 114, and operating profiles 116.

As just mentioned, and as illustrated in FIG. 1, the energy management system 100 includes the remaining energy manager 102. The remaining energy manager 102 can calculate, estimate, determine, monitor, forecast, predict, and/or identify a measure of remaining energy. In particular, the remaining energy manager 102 can estimate a measure of remaining energy with regard to a UAV. For instance, the remaining energy manager 102 can calculate a measure of remaining energy with regard to a battery powering a UAV during flight. More specifically, the remaining energy manager 102 can calculate a remaining battery time with regard to a battery powering a UAV on a mission plan.

The remaining energy manager 102 can also forecast a measure of remaining energy. For example, the remaining energy manager 102 can estimate a measure of remaining energy at a future point (in time or space) of a mission plan. Thus, the remaining energy manager 102 can determine a measure of remaining energy with regard to one or more potential transition points.

The remaining energy manager 102 can calculate (e.g., forecast or predict) a measure of remaining energy based on a variety of factors. For example, in one or more embodiments, the remaining energy manager 102 calculates a measure of remaining energy by calculating a discharge rate. In particular, the remaining energy manager 102 can measure the amount of energy lost and/or consumed over a period of time (and/or over a particular distance) and determine the discharge rate based on the measurements. The remaining energy manager 102 can utilize the discharge rate to estimate a measure of remaining energy at a later point by applying the discharge rate over a future amount of time and/or distance.

Similarly, the remaining energy manager 102 can calculate a measure of remaining energy based on environmental factors (e.g., temperature, humidity, pressure, wind speed, wind direction, amount of precipitation, type of precipitation, or other environmental factors). For instance, the remaining energy manager 102 can receive one or more environmental factors (e.g., from the environmental facility 108) and calculate a measure of remaining energy based on the environmental factors. In particular, the remaining energy manager 102 can receive an average wind speed and direction and utilize the average wind speed and direction to estimate a measure of remaining energy at a potential transition point. Similarly, the remaining energy manager 102 can utilize an average wind speed and direction to estimate remaining battery time with regard to a battery powering a UAV during a mission plan.

Moreover, the remaining energy manager 102 can calculate a measure of remaining energy based on anticipated navigation operations. For example, the remaining energy manager 102 can access an existing mission plan (e.g., from the mission plan engine 106) and determine anticipated navigation operations (such as changes in position, direction, velocity, acceleration, or altitude). The remaining energy manager 102 can estimate the amount of energy required to execute the anticipated navigation operations and, in turn, calculate a measure of remaining energy after the anticipated navigation operations. In this manner, one or more embodiments of the remaining energy manager 102, calculate a measure of remaining energy with regard to one or more potential transition points.

In one or more embodiments, the remaining energy manager 102 also monitors battery life-cycle over time and utilizes the monitored information to estimate a measure of remaining energy. For example, batteries tend to retain and provide energy differently based on a variety of factors, including age, use, number of recharges, and other factors. Accordingly, the remaining energy manager 102 can monitor factors such as age, use, number of charges, or other factors over the life-cycle of a battery to more accurately calculate a measure of remaining energy.

The remaining energy manager 102 can also monitor a variety of metrics with regard to the amount of energy utilized by a UAV during flight and the amount of energy in a battery. For example, the remaining energy manager 102 can track the voltage, current, power, and energy provided by a battery to a UAV over time during a flight. Moreover, the remaining energy manager 102 can detect the voltage, current, power, and energy of a battery at any time.

As shown in FIG. 1, the energy management system 100 also includes the landing energy calculator 104. The landing energy calculator 104 can estimate, determine, calculate, or identify a measure of landing energy. In particular, the landing energy calculator 104 can calculate a measure of landing energy needed to fly a UAV from a transition point to a landing station. For example, in one or more embodiments, the landing energy calculator 104 can calculate a travel time with regard to a route from a transition point to a landing station.

The landing energy calculator 104 can receive one or more routes (e.g., from the mission plan engine 106) and estimate a measure of landing energy with regard to the one or more routes. For instance, the landing energy calculator 104 can receive a route between a potential transition point and a landing station from the mission plan engine 106. The landing energy calculator 104 can then determine a measure of energy needed by a UAV to fly the route and land at the landing station.

The landing energy calculator 104 can calculate a measure of landing energy based on a variety of factors. For example, similar to the remaining energy manager 102, the landing energy calculator 104 can calculate and/or utilize a discharge rate to estimate a measure of landing energy. Moreover, the landing energy calculator 104 can obtain and utilize environmental factors in estimating a measure of landing energy.

Moreover, the landing energy calculator 104 can also utilize information regarding navigation operations to estimate a measure of landing energy. For example, the landing energy calculator 104 can identify changes in position, direction, velocity, acceleration, and altitude along a route to a landing station and determine a measure of landing energy required to execute the identified navigation operations.

As shown in FIG. 1, the energy management system 100 also includes the mission plan engine 106. The mission plan engine 106 can generate, calculate, create, modify, or revise one or more mission plans. For instance, the mission plan engine 106 can generate a mission plan comprising a plurality of flight legs that traverse a target site (e.g., to capture a plurality of digital aerial images) within a mission boundary. Moreover, the mission plan engine 106 can modify the mission plan to incorporate one or more transition points and/or routes to return to ground (e.g., return to a landing station). In addition, the mission plan engine 106 can further modify a mission plan based on the one or more transition points and/or routes to more efficiently traverse the target site.

As mentioned, the mission plan engine 106 can generate a mission plan with regard to a target site. In particular, in one or more embodiments, the mission plan engine 106 generates a mission plan to traverse a target site to capture digital aerial images of the site. For example, in one or more embodiments, the mission plan engine 106 generates a mission plan comprising a plurality of flight legs that traverse the target site and remain within a mission boundary. Moreover, in one or more embodiments, the mission plan engine 106 generates parallel flight legs that traverse the target site in a uniform manner to generate digital aerial images of approximately uniform dimension, scale, and overlap ratios.

The mission plan engine 106 can generate mission plans that include altitude information. For example, the mission plan engine 106 can generate a mission plan that maintains a constant altitude (within a certain range) above the ground. In particular, the mission plan engine 106 can obtain ground elevation data (e.g., from site data 114) and utilize the ground elevation data to generate altitude data such that the mission plan engine 106 maintains a particular altitude above the ground.

The mission plan engine 106 can also generate one or more routes to return to ground. For example, the mission plan engine 106 can generate one or more routes to return to a landing station. In particular, the mission plan engine 106 can generate routes between transition points (or potential transition points) of flight legs of a mission plan to a landing station. The mission plan engine 106 can also generate routes from a landing station to a flight leg of the mission plan.

In generating routes, the mission plan engine 106 can account for a variety of factors. For example, the mission plan engine 106 can detect and circumvent one or more obstacles (e.g., buildings, no-fly-zones, sensitive areas, etc.).

For instance, the mission plan engine 106 can generate routes to circumvent obstacles by going around them or over them.

Accordingly, the mission plan engine 106 can also generate altitude data with regard to routes to or from a landing station. For example, the mission plan engine 106 can determine an elevation of one or more obstacles and generate a route with elevation data that maintains a minimum clearance between the obstacle and the UAV.

The mission plan engine 106 can also modify a mission plan. For example, the mission plan engine 106 can modify a mission plan based on a selected transition point and/or route between the transition point and a landing station. In particular, in one or more embodiments, the mission plan engine 106 modifies a mission plan by adding a route between a transition point and a landing station and adding a return route between the landing station and the transition point to the mission plan.

In addition to adding routes to (or from) a landing station to a mission plan, the mission plan engine 106 can also modify a mission plan in a variety of other ways. In particular, the mission plan engine 106 can modify flight legs of a mission plan based on a determined transition point or route to a landing station. For example, upon traversing a first portion of a mission plan, determining a transition point and/or route, and traveling to a landing station, the mission plan engine 106 can determine a new mission plan for the remaining portion of the mission plan. For example, the mission plan engine 106 can generate a new mission plan with different flight legs that more efficiently traverse the remaining portion of the mission plan.

As shown in FIG. 1, the energy management system 100 also includes the environmental facility 108. The environmental facility 108 can determine, detect, receive, identify, calculate, and/or estimate environmental factors. For example, the environmental facility 108 can determine temperature, humidity, air pressure, wind speed, wind direction, and any other environmental factors.

The environmental facility 108 can directly detect environmental factors. For example, in one or more embodiments, the environmental facility 108 comprises a plurality of environmental sensors aboard a UAV. Similarly, in one or more embodiments, the environmental facility 108 comprises environmental sensors placed within or near a target site (e.g., at or near a landing station). For example, the environmental facility 108 can comprise a plurality of sensors operatively connected to a landing station and the landing station can send environmental factors to the UAV.

Moreover, the environmental facility 108 can also obtain environmental factors from a remote source. For example, the environmental facility 108 can communicate with a remote server to obtain environmental factors. In particular, the environmental facility 108 can utilize a network to communicate with a remote server storing environmental information, such as a website that provides a weather service. The environmental facility 108 (e.g., connected to the Internet via a landing station or other computing device) can obtain the environmental information and provide the environmental information to other components of the energy management system 100 (e.g., to the remaining energy manager 102 which, for example, can be implemented within a UAV).

Moreover, as illustrated in FIG. 1, the energy management system 100 also includes the storage manager 110. The storage manager 110 maintains data for the energy management system 100. The storage manager 110 can maintain data of any type, size, or kind, as necessary to perform the functions of the energy management system 100.

As illustrated in FIG. 1, the storage manager 110 includes mission plan data 112. Mission plan data 112 includes information regarding a mission plan. For instance, mission plan data 112 includes information regarding flight legs (e.g., position information and altitude data). Mission plan data 112 also includes transition points (or potential transition points), routes (or potential routes), landing station locations, and other information. Mission plan data 112 also includes information regarding a current flight, including distance traveled, flight legs traversed, or takeoff location. Mission plan data 112 includes any mission plan information necessary to enable a UAV to traverse a target site and capture a plurality of digital aerial images.

Moreover, as shown in FIG. 1, the storage manager 110 also includes site data 114. Site data 114 can include information regarding a target site. For example, site data 114 can include information regarding site boundaries, elevation, or obstacles. Moreover, site data 114 includes one or more environmental factors detected or determined by the energy management system 100 (e.g., via the environmental facility 108).

In addition, as shown in FIG. 1, the storage manager 110 also includes operating profiles 116. Operating profiles 116 include information regarding one or more UAVs. For instance, operating profiles 116 include information regarding operating capabilities of a UAV, such as cruising speed, maximum speed, maximum altitude, ascending speed, or descending speed. Similarly, operating profiles 116 can include information regarding battery capacity, voltage, or discharge rate. Moreover, operating profiles 116 can include information regarding a measure of energy needed by a UAV to perform certain functions. For example, operating profiles 116 can include information regarding a measure of energy (e.g., time, power, voltage, etc.) required to engage in navigation operations, such as flying, ascending, descending, taking off, landing, etc.

Each of the components 102-110 of the energy management system 100 and their corresponding elements may be in communication with one another using any suitable communication technologies. It will be recognized that although components 102-110 are shown to be separate in FIG. 1, any of components 102-110 may be combined into fewer components (such as into a single component), divided into more components, or configured into different components as may serve a particular embodiment. Moreover, one or more embodiments of the energy management system 100 may include additional components or fewer components than those illustrated in FIG. 1.

The components 102-110 and their corresponding elements can comprise software, hardware, or both. For example, the components 102-110 and their corresponding elements can comprise one or more instructions stored on a computer-readable storage medium and executable by processors of one or more computing devices. When executed by the one or more processors, the computer-executable instructions of the energy management system 100 can cause one or more computing systems (e.g., one or more server devices) to perform the methods and provide the functionality described herein. Alternatively, the components 102-110 can comprise hardware, such as a special purpose processing device to perform a certain function or group of functions. Additionally or alternatively, the components 102-110 can comprise a combination of computer-executable instructions and hardware.

Furthermore, the components 102-110 of the energy management system 100 and their corresponding elements may, for example, be implemented as one or more stand-alone applications, as one or more modules of an application, as one or more plug-ins, as one or more library functions or functions that may be called by other applications, and/or as a cloud-computing model. Thus, the components 102-110 of the energy management system 100 and their corresponding elements may be implemented as a stand-alone application, such as a desktop or mobile application. Furthermore, the components 102-110 of the energy management system 100 may be implemented as one or more web-based applications hosted on a remote server. Alternatively or additionally, the components of the energy management system 100 may be implemented in a suite of mobile device applications or "apps."

Figure 2:
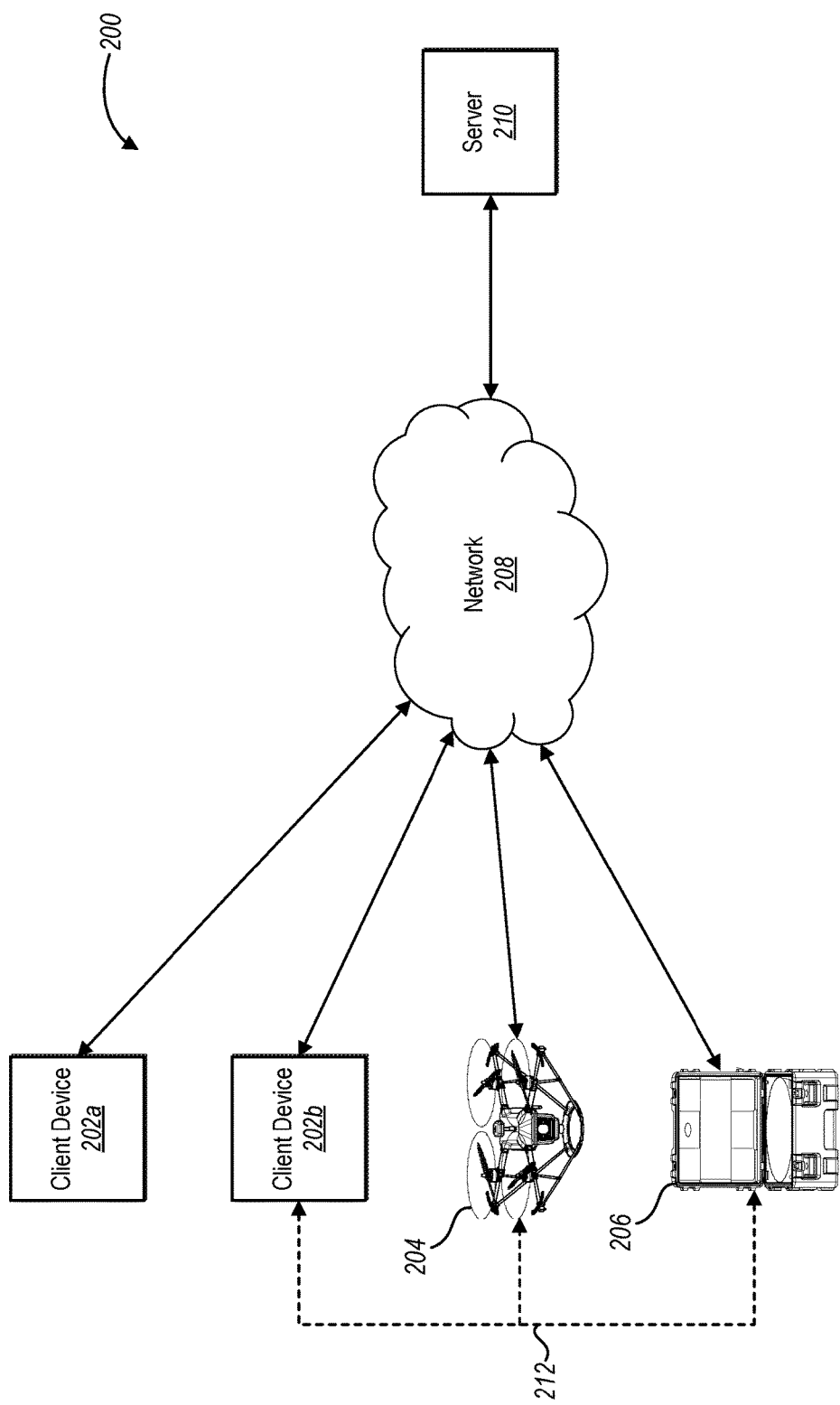
FIG. 2 illustrates a schematic diagram of an exemplary environment in which the energy management system of FIG. 1 can operate in accordance with one or more embodiments.
Figure 8:
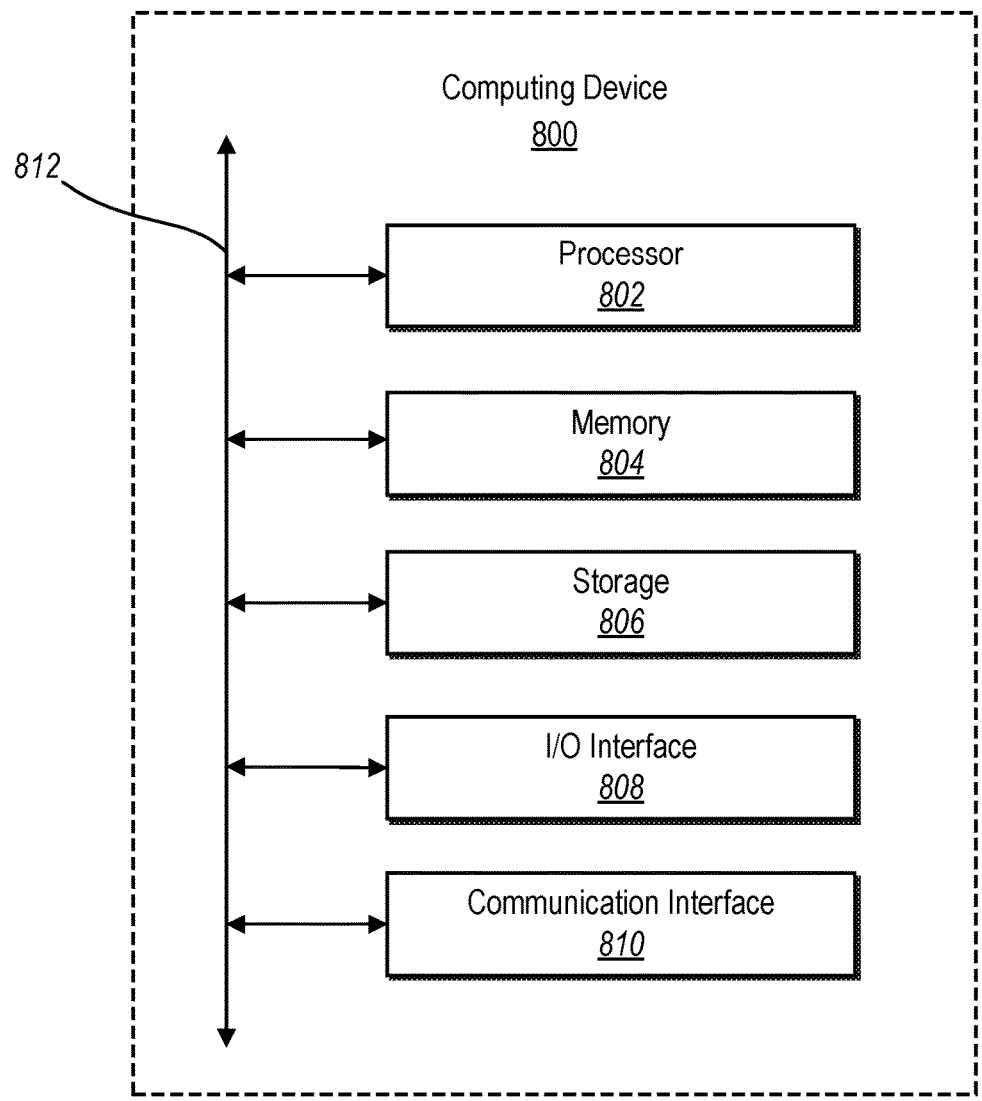
FIG. 8 illustrates a block diagram of an exemplary computing device in accordance with one or more embodiments.

Turning now to FIG. 2, further information will be provided regarding implementation of the energy management system 100. Specifically, FIG. 2 illustrates a schematic diagram of one embodiment of an exemplary system environment ("environment") 200 in which the energy management system 100 can operate. As illustrated in FIG. 2, the environment 200 can include client devices 202a-202b, a UAV 204, a docking station 206, a network 208, and server(s) 210. The client devices 202a-202b, the UAV 204, the docking station 206, the network 208, and the server(s) 210 may be communicatively coupled with each other either directly or indirectly (e.g., through network 208). The client devices 202a-202b, the UAV 204, the docking station 206, the network 208, and the server(s) 210 may communicate using any communication platforms and technologies suitable for transporting data and/or communication signals, including any known communication technologies, devices, media, and protocols supportive of remote data communications, examples of which will be described in more detail below with respect to FIG. 8.

As just mentioned, and as illustrated in FIG. 2, the environment 200 can include the client devices 202a-202b. The client devices 202a-202b may comprise any type of computing device. For example, the client devices 202a-202b may comprise one or more personal computers, laptop computers, mobile devices, mobile phones, tablets, special purpose computers, TVs, or other computing devices. In one or more embodiments, the client devices 202a-202b may comprise computing devices capable of communicating with the UAV 204, the docking station 206, and/or the server(s) 210. More specifically, in one or more embodiments, a pilot may utilize the client device 202b to locally control and/or communicate with the UAV 204. The client devices 202a-202b may comprise one or more computing devices as discussed in greater detail below with regard to FIG. 8.

Moreover, FIG. 2 also illustrates that the environment 200 can include the UAV 204. As used herein, the term "UAV" or "unmanned aerial vehicle" refers to an aircraft that can be piloted autonomously or remotely by a control system. Accordingly, the UAV 204 may comprise any type of UAV, including a micro UAV, low altitude UAV, or high altitude UAV, whether autonomously or remotely piloted. Similarly, the UAV 204 may include multi-rotor UAVs, single-rotor UAVs, blimp UAVs, or other types of UAVs. In particular, the UAV 204 may include an onboard computer that controls the autonomous flight of the UAV 204.

In at least one embodiment, the UAV 204 is a multi-rotor vehicle, such as a quadcopter, and includes a carbon fiber shell, integrated electronics, a battery bay, a global positioning system ("GPS") receiver, a fixed or swappable imaging system (e.g., a digital camera), and various additional sensors and/or receivers. The UAV 204 may contain one or more computer-readable storage media and/or one or more processors with instructions stored thereon that, when executed by the one or more processors cause the UAV 204 to perform functions described herein.

The UAV 204 can include any type or variety of battery that utilizes electrochemical cells to convert stored chemical energy into electrical energy. For example, the UAV 204 can utilize a rechargeable battery or a disposable battery. The UAV 204 can utilize an alkaline battery, a lead-acid battery, a lithium battery, mercury oxide battery, zinc-air battery, Zamboni pile battery, silver-oxide battery, magnesium battery, zinc-carbon battery, nickel oxyhydroxide battery, NiCd battery, NiMH battery, NiZn battery, AgZn battery, or other type of battery. In one or more embodiments, the UAV 204 can also include a rechargeable solar cell that can recharge before, during, or after a flight utilizing solar energy.

Moreover, the UAV 204 can include one or more components for tracking battery life-cycle. For example, the UAV 204 can include one or more circuits for monitoring and storing information regarding battery usage, including number of charges, number of discharges, number of flights, discharge rate (e.g., energy consumption rate), maximum energy storage, battery age, etc.

Alternatively or additionally, the environment 200 may include the docking station 206. The docking station 206 may be utilized to land, store, charge, guide, or repair the UAV 204. In particular, in one or more embodiments, the docking station 206 can charge or replace batteries exhausted by the UAV 204 during flight. Moreover, the docking station 206 may be utilized to communicate with the UAV 204 prior to, during, or after a flight. For example, in one or more embodiments, one or more landing stations discussed herein comprise the docking station 206.

As illustrated in FIG. 2, the client devices 202a-202b, the UAV 204, the docking station 206, and/or the server(s) 210 may communicate via the network 208. The network 208 may represent a network or collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the network 208 may be any suitable network over which the client devices 202a-202b (or other components) may access the server(s) 210 or vice versa. The network 208 will be discussed in more detail below with regard to FIG. 8.

Moreover, as illustrated in FIG. 2, the environment 200 also includes the server(s) 210. The server(s) 210 may generate, store, receive, and/or transmit any type of data, including mission plan data 112, site data 114, and operating profiles 116. For example, the server(s) 210 can receive data from the client device 202a and send the data to the client device 202b, the UAV 204, and/or the docking station 206. In one example embodiment, the server(s) 210 comprise a data server. The server(s) 210 can also comprise a communication server or a web-hosting server. Additional details regarding the server(s) 210 will be discussed below with respect to FIG. 8.

Although FIG. 2 illustrates two client devices 202a-202b, the single UAV 204, and the single docking station 206, it will be appreciated that the client devices 202a-202b, the UAV 204, and the docking station 206 can represent any number of computing devices, UAVs, or docking stations (fewer or greater than shown). Similarly, although FIG. 2 illustrates a particular arrangement of the client devices 202a-202b, the UAV 204, the docking station 206, the network 208, and the server(s) 210, various additional arrangements are possible.

For example, the client device 202b, the UAV 204 and/or the docking station 206 may communicate directly one with another via a local connection 212. The local connection 212 may comprise any recognized form of wired or wireless communication. For example, in one or more embodiments the client device 202b may include a mobile computing device (e.g., tablet) utilized by a UAV operator to communicate with the UAV 204 and the docking station 206 using BLUETOOTH technology.

By way of an additional example, in one or more embodiments, the client device 202a can generate a mission plan with regard to a target site, transmit the mission plan to the client device 202b via the network 208 (and the server(s) 210), and the client device 202b can convey the mission plan to the UAV 204. The UAV 204 can take off from the docking station 206 (or other landing station) and begin to execute the mission plan with regard to a target site. While in flight, the UAV 204 can monitor a measure of remaining energy with regard to a battery providing energy to the UAV for flight (e.g., via the remaining energy manager 102). The UAV 204 can also identify potential transition points, routes between the transition points and the docking station 206 (e.g., via the mission plan engine 106), and a measure of landing energy required to traverse the routes (e.g., via the landing energy calculator 104). The UAV 204 can compare the measure of remaining energy and the measure of landing energy, identify a transition point and route, and modify the mission plan to include the transition point and route (e.g., via the mission plane engine 106) based on the comparison (e.g., the nearest transition point to the landing station corresponding to the lowest measure of remaining energy still greater than the measure of landing energy required to traverse the route between the nearest transition point and the landing station). In addition, the UAV 204 can return to the docking station 206 via the identified route.

Moreover, in one or more embodiments, the docking station 206, the client device 202b, and/or the UAV 204 can obtain environmental factors (e.g. via the environmental facility 108). For example, the docking station 206 and/or the client device 202b can access a remote server that contains weather information. Similarly, the UAV 204 can comprise environmental sensors (e.g., one or more thermometers, barometers, pitot tubes, and/or GPS units) tracking environmental factors during flight. Moreover, the docking station 206 can comprise one or more environmental sensors. Similarly, environmental sensors may be placed separately from the docking station 206 and convey information to the docking station 206 or the client device 202b. Environmental factors obtained by the docking station 206 and/or the client device 202b can be transmitted to the UAV 204 (or vice versa). The UAV 204 can utilize environmental factors to more accurately calculate a measure of remaining energy (e.g., via the remaining energy manager 102) and/or a measure of landing energy (e.g., via the landing energy calculator 104).

As illustrated by the previous example embodiments, the energy management system 100 may be implemented in whole, or in part, by the individual elements 202a-210 of the environment 200. Although the previous examples, describe certain components of the energy management system 100 implemented with regard to certain components of the environment 200, it will be appreciated that components of the energy management system 100 can be implemented in any of the components of the environment 200. For example, the energy management system 100 may be implemented entirely on the UAV 204. Similarly, the energy management system 100 may be implemented on the client device 202b, the landing station 206, or the server(s) 210. Alternatively or additionally, different components and functions of the energy management system 100 may be implemented separately among the client devices 202a-202b, the UAV 204, the docking station 206, the network 208, and the server(s) 210. For instance, in addition to the examples provided above, the remaining energy manager 102 and the landing energy calculator 104 may be implemented as part of the docking station 206, the client device 202b, or the server(s) 210. Similarly, the mission plan engine 106 may be implemented as part of the docking station 206, the client device 202b, or the server(s) 210.

Figure 3A:
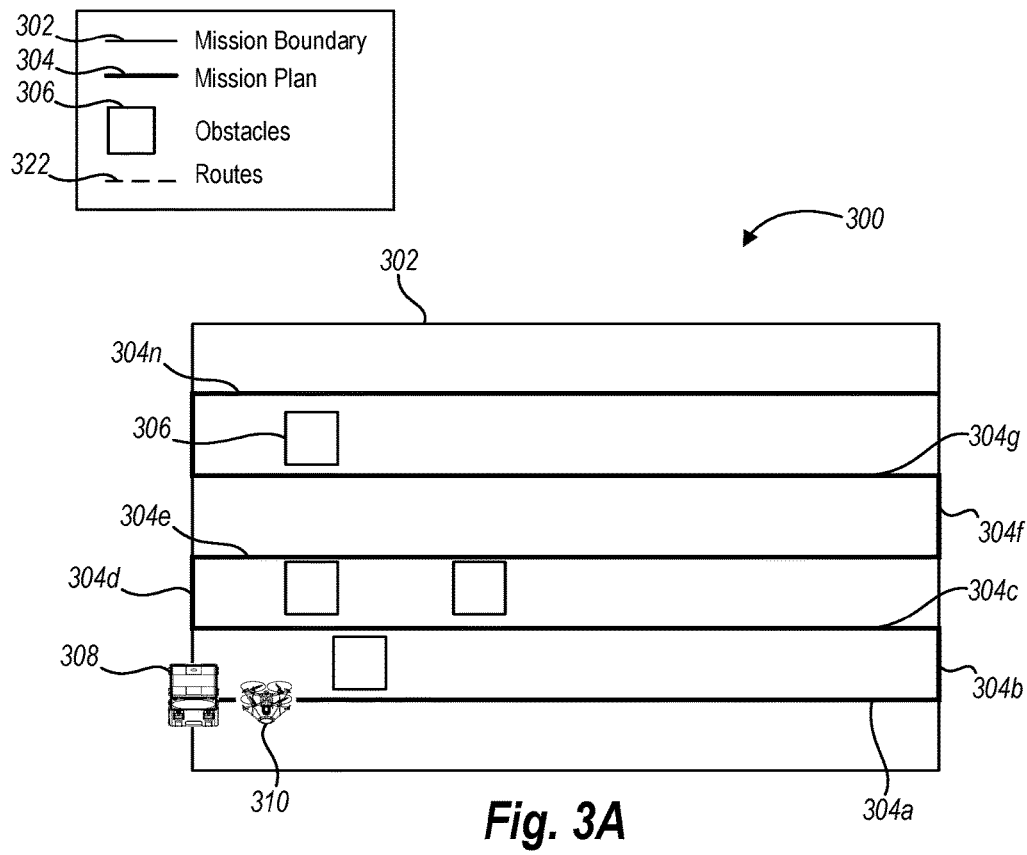
FIG. 3A illustrates a representation of a target site, UAV, landing station, mission plan, and obstacles in accordance with one or more embodiments.

Turning now to FIGS. 3A-3D, additional detail will be provided regarding identifying transition points and/or routes in accordance with one or more embodiments. In particular, FIG. 3A illustrates a target site 300 containing obstacles 306 with a mission boundary 302. More particularly, FIG. 3A illustrates that the energy management system 100 generates a mission plan 304 comprising flight legs 304a-304n which enables a UAV 310 to traverse the target site 300 within the mission boundary 302, beginning at the landing station 308.

The energy management system 100 can identify or generate the mission boundary 302. For example, the energy management system 100 can identify the mission boundary 302 from one or more property boundaries, obstacles, roads, fences, flight zones, areas, or other boundaries. In particular, the energy management system 100 identifies the mission boundary 302 as a property boundary with regard to the square target site 300.

It will be appreciated that although the mission boundary 302 of FIG. 3A is a rectangular shape, the energy management system 100 can identify, detect, receive, or generate a mission boundary of any shape. For example, in one or more embodiments, the mission boundary 302 is a complex polygon that follows the contours of a property line, no-fly zone, sensitive area, or other boundary information.

As illustrated in FIG. 3A, upon determining the mission boundary 302, the energy management system 100 can generate the mission plan 304. In particular, the energy management system 100 generates the mission plan 304 to permit the UAV 310 to traverse the target site 300 within the mission boundary 302 and capture digital aerial images of the target site 300. In particular, the energy management system 100 generates a plurality of flight legs 304a-304n to traverse the target site 300 such that the UAV 310 (and a camera affixed to the UAV) can capture digital aerial images of the entire target site 300 with a particular resolution and overlap with regard to the digital aerial images. Specifically, in one or more embodiments, the energy management system 100 generates the mission plan 304 by utilizing the techniques described with regard to Yifei Teng, David Chen, & Patrick Stewart, GENERATING A MISSION PLAN FOR CAPTURING AERIAL IMAGES WITH AN UNMANNED AERIAL VEHICLE, Ser. No. 14/887,954, filed Oct. 20, 2015, which is incorporated by reference here.

Upon generating the mission plan 304, the UAV 310 traverses the target site 300 by following the mission plan 304. Moreover, during flight, the energy management system 100 can monitor a measure of remaining energy and a measure of landing energy with regard to the UAV 310 to identify a transition point and route to return to the landing station 308. For example, upon launching from the landing station 308, the energy management system 100 can estimate a measure of remaining energy (e.g., remaining battery time, remaining battery power, voltage, or some other measure) with regard to a battery associated with the UAV 310.

In particular, the energy management system 100 can monitor a discharge rate with regard to a battery associated with the UAV 310. For example, the energy management system 100 can monitor an amount of energy utilized (e.g., consumed) to power flight of the UAV 310 (e.g., an amount of energy provided to rotors of the UAV 310) over a distance (and/or time) travelled during the course of the mission plan 304. Based on the amount of energy utilized over a distance (and/or time) travelled, the energy management system 100 can calculate a discharge rate (e.g., an energy consumption rate) with regard to the battery associated with the UAV 310. The energy management system 100 can utilize the calculated discharge rate (e.g., an energy consumption rate) to calculate a measure of remaining energy.

For example, the energy management system 100 can determine that a battery associated with the UAV 310 has consumed one-half of its energy in traversing two miles of a mission plan in approximately thirty minutes. The energy management system 100 can calculate a discharge rate (e.g., discharge of all the energy per hour, or discharge of one-quarter of the energy per mile) and estimate a measure of remaining energy (e.g., one-half hour of flight time, two miles of flight distance, or one-half of the original energy).

The energy management system 100 can also monitor a charge rate with regard to a battery associated with the UAV 310. For example, the energy management system 100 can monitor an amount of energy received during flight of the UAV 310 (e.g., the amount of energy received from a solar charging cell) over a time and/or distance. The energy management system 100 can calculate a charge rate based on the amount of energy received. The energy management system 100 can utilize the charge rate to estimate a measure of remaining energy (e.g., an amount of remaining battery time or a remaining distance).

The energy management system 100 can also forecast a measure of remaining energy with regard to a future point in the mission plan 304. For example, the energy management system 100 can utilize a calculated discharge rate (and or charge rate) to forecast a measure of remaining energy after the UAV 310 travels an additional mile or an additional fifteen minutes.

As mentioned above, the energy management system 100 can also account for an effect of one or more environmental conditions in calculating a measure of remaining energy. In particular, the energy management system 100 can consider wind speed, wind direction, temperature, humidity, etc. in calculating a measure of remaining energy. For example, some battery types have different operating characteristics (e.g., discharge rates) based on temperature. The energy management system 100 can determine a temperature and utilize the temperature to calculate a measure of remaining energy.

Similarly, the energy management system 100 can account for wind (i.e., an effect of the one or more environmental conditions) in calculating a measure of remaining energy. For example, the energy management system 100 can determine a wind speed and wind direction and estimate a measure of energy attributable to the wind (e.g., an amount of energy lost due to wind or an amount of energy saved due to wind). For example, the energy management system 100 can determine that the UAV 310 will fly in a five mile per hour headwind. The energy management system 100 can determine that the ground speed of the UAV 310 will be reduced by five miles per hour, and the distance traveled by the UAV 310 will be reduced by five miles per hour (or that the UAV 310 will have to exert an additional measure of energy to maintain the same ground speed while flying into a five-mile-per-hour headwind). Moreover, the energy management system 100 can determine a measure of energy required to accommodate for the headwind (e.g., adding traveling time, reducing traveling speed, or increasing a rate of energy consumption due to the headwind in utilizing a discharge rate).

Conversely, the energy management system 100 can also account for energy as a result of a tailwind. For example, the energy management system 100 can determine that the UAV 310 will fly in a five mile per hour tailwind. The energy management system 100 can determine that the ground speed of the UAV 310 will increase by five miles per hour (or that the UAV will conserve energy due to the tailwind by maintaining speed or that the UAV 310 will have to fight against the tailwind to maintain a slower ground speed, if necessary). The energy management system 100 can determine a measure of energy to accommodate for the tailwind (e.g., increased speed or distance or decreased consumption of energy).

In one or more embodiments, the energy management system 100 can account for wind by comparing operation of the UAV 310 with one or more operating profiles. For example, the energy management system 100 can compare actual ground speed at a particular energy discharge rate with an operating profile indicating an expected energy discharge rate for a given ground speed of the UAV 310 in normal conditions. Based on the comparison, the energy management system 100 can determine a wind speed. Similarly, the energy management system 100 can compare a measured discharge rate (e.g., an energy consumption rate) of a battery associated with the UAV 310 with an operating profile of the UAV 310 (e.g., average energy consumption rate stored in an operating profile) and determine a measure of energy corresponding to the wind.

For example, the energy management system 100 can determine that a UAV has utilized half of its battery by flying one mile in a first direction. The energy management system 100 can access an operating profile indicating that the UAV normally utilizes one-quarter of its battery in flying one mile. Based on the difference in the discharge rate (e.g., an energy consumption rate) and the one or more operating profiles (e.g., average energy consumption rate), the energy management system 100 can estimate an effect of the one or more environmental factors (e.g., wind is exhausting an additional one-half battery per mile flying in the first direction).

Moreover, the energy management system 100 can utilize the measure of the environmental factors to estimate a measure of remaining energy. For example, the energy management system 100 can determine that flying in the opposite direction will most likely need less energy than flying in the first direction. In particular, the energy management system 100 can determine that it can fly one mile in the opposite direction utilizing one-eighth of its battery. Moreover, the energy management system 100 can determine that when the UAV 310 returns to the first direction, the battery will again experience an increased discharge rate.

As mentioned, the energy management system 100 can also calculate varying discharge rates to account for energy attributable to environmental factors. For instance, the energy management system 100 can calculate a discharge rate for headwind and a discharge rate for tailwind. For example, the energy management system 100 can determine that the UAV 310 flies for thirty minutes (or one mile) in a first direction against the wind and utilizes one-half of a battery's energy. The energy management system 100 can then determine that the UAV 310 flies for thirty minutes (or one mile) in a direction opposite the first direction with the wind and utilizes one-quarter of a battery's energy. The energy management system 100 can calculate a discharge rate based on the energy utilized to fly with the wind and a discharge rate based on the energy utilized to fly against the wind, and estimate a remaining measure of energy based on the varying discharge rates.

For example, the energy management system 100 can utilize the mission plan 304 to determine that the UAV 310 will again fly in the first direction. Based on the discharge rate in flying against the wind (e.g., a full battery per hour or mile), the energy management system 100 can determine that the UAV 310 will exhaust the remaining one-quarter of the battery's energy within fifteen minutes of flying in the first direction.

The energy management system 100 can also estimate a measure of remaining energy by accessing a direct measure of environmental factors. For example, the energy management system 100 can access a wind direction and a wind speed (e.g., from environmental sensors or from a third-party source of environmental conditions) and estimate a remaining battery life based on wind direction and wind speed. In particular, based on the added amount of air speed due to the wind direction and wind speed, the energy management system 100 can estimate a measure of remaining energy.

Similarly, the energy management system 100 can access a temperature, humidity, air pressure, or other environmental factors and utilize the environmental factors to estimate a measure of remaining energy.

In one or more embodiments, the energy management system 100 also considers battery life-cycle in calculating a measure of remaining energy. In particular, the energy management system 100 can monitor variety of factors with regard to a battery, including, age, use, number of flights, and number of recharges. The energy management system 100 can utilized information regarding the life-cycle of the battery to calculate a measure of remaining energy.

For example, the energy management system 100 can determine that after a particular number of charges, a discharge rate associated with a UAV battery decreases by a particular amount. For example, the energy management system 100 can access an operating profile with regard to a battery to determine a change in battery operation with regard to use, age, number of flights, or number of charges. The energy management system 100 can utilize information regarding a change in battery operation based on life-cycle to estimate a measure or remaining energy. Accordingly, the remaining energy manager 102 can monitor factors such as age, use, number of charges, or other factors over the life-cycle of a battery to more accurately calculate a measure of remaining energy.

In addition to monitoring and calculating a measure of remaining energy during flight, the energy management system 100 can also calculate a measure of landing energy. In particular, the energy management system 100 can calculate a measure of landing energy with regard to potential transition points and routes leading from potential transition points to a landing station. More specifically, in one or more embodiments, the energy management system 100 samples a plurality of potential transition points and/or potential routes back to the landing station 308 and analyzes a measure of landing energy corresponding to the potential transition points and/or potential routes to determine a final transition point and route back to the landing station 308.

Figure 3B:
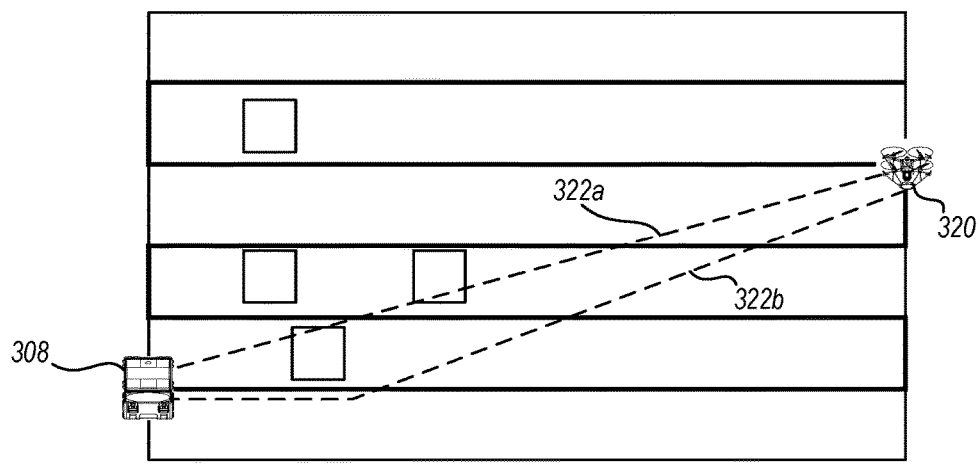
FIG. 3B illustrates a representation of a potential transition point and a plurality of potential routes for returning to the landing station of FIG. 3A in accordance with one or more embodiments.

For example, FIG. 3B illustrates identifying and analyzing a potential transition point and/or routes in accordance with one or more embodiments of the energy management system 100. As shown in FIG. 3B, the energy management system 100 identifies a potential transition point 320. Moreover, the energy management system 100 identifies potential routes 322a and 322b from the potential transition point 320 to the landing station 308.

The energy management system 100 can identify potential transition points in a variety of ways. In one or more embodiments, the energy management system 100 identifies potential transition points by sampling from a current position of the UAV 310. For example, the energy management system 100 can determine a current position of the UAV 310, utilize the current position of the UAV 310 as a potential transition point, and calculate potential routes from the potential transition point to the landing station 308.

In addition, in one or more embodiments, the energy management system 100 samples potential transition points from the mission plan 304. For example, the energy management system 100 can analyze potential transition points at certain distances (e.g., every 50 feet) or at certain times (e.g., every minute) along the mission plan 304.

Similarly, the energy management system 100 can also sample potential transition points at the beginning or the end of flight legs (e.g., the flight legs 304a-304n). For example, with regard to the embodiment of FIG. 3B, the energy management system 100 identifies potential transition point 320 by determining that the potential transition point 320 falls at the end of the flight legs 304f and 304g.

Moreover, the energy management system 100 can identify potential transition points by analyzing the time, distance, or energy required to reach particular points along the mission plan 304. For example, the energy management system 100 can identify the points on the mission plan 304 that are nearest to the landing station 310 (i.e., nearer than surrounding positions) and analyze the points as potential transition points. In yet other embodiments, the energy management system 100 analyzes every point along the mission plan 304 as a potential transition point (i.e., calculates and analyzes one or more routes with regard to each point along the mission plan 304).

Upon identifying potential transition points, the energy management system 100 can also generate routes. In particular, the energy management system 100 can generate potential routes between the potential transition points and landing stations. Moreover, the energy management system 100 can analyze the potential transition points and/or potential routes to identify a route to travel from an existing mission plan to a landing station.

The energy management system 100 can generate a variety of potential routes. For example, in one or more embodiments, the energy management system 100 generates potential routes between potential transition points and landing stations based on distance, energy, and/or time. For example, in one or more embodiments, the energy management system 100 identifies a route between a transition point and a landing station that requires the shortest distance or the shortest time. Moreover, the energy management system 100 can also identify a route between a transition point and a landing station that requires the least amount of power or energy.

In one or more embodiments, the energy management system 100 generates a plurality of potential routes and identifies the route that corresponds to the lowest measure of landing energy. For instance, with regard to FIG. 3B, the energy management system 100 identifies two potential routes 322a, 322b. The energy management system 100 generates the potential route 322a based on the shortest straight distance between the potential transition point 320 and the landing station 308. However, the energy management system 100 recognizes that the potential route 322a crosses the obstacles 306. Accordingly, the energy management system 100 also generates the potential route 322b based on the shortest straight distance between the potential transition point 320 and the landing station 308 that avoids the obstacles 306.

As mentioned previously, the energy management system 100 can determine a measure of landing energy with regard to one or more routes. In particular, the energy management system 100 can determine a route that requires the least amount of energy to traverse between a transition point and a landing station. Thus, for example, the energy management system 100 can determine a measure of landing energy with regard to the potential routes 322a, 322b and identify a route that will require the least amount of landing energy. In particular, the energy managements system 100 can compare the measure of landing energy associated with the potential route 322a and the measure of landing energy associated with the potential route 322b and determine that the potential route 322b requires a smaller measure of landing energy (e.g., a smaller amount of time, a smaller amount of power, or some other measure of energy).

The energy management system 100 can account for altitude changes, directional changes, and other navigation operations in identifying routes and determining a measure of landing energy associated with a route. For example, the energy management system 100 can determine starting altitude, landing altitude, and any changes in altitude necessary to land a UAV. Similarly, the energy management system 100 can calculate routes that circumvent obstacles.

Figure 3C:
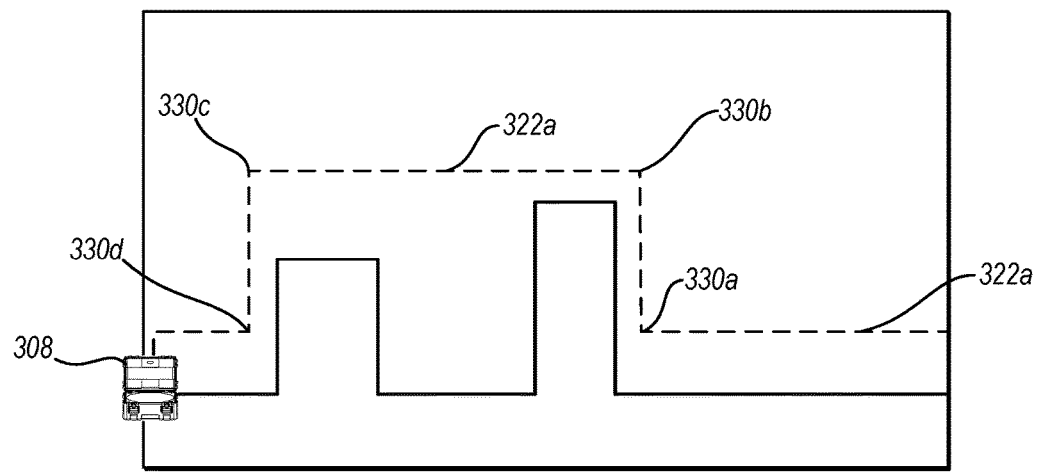
FIG. 3C illustrates a representation of a profile of a route for returning to the landing station of FIG. 3A in accordance with one or more embodiments.

For example, FIG. 3C illustrates a profile view of the potential route 322a. In particular, as shown in FIG. 3C, in order to circumvent the obstacles 306 while traversing the potential route 322a, the UAV 310 will have to modify its altitude and direction at various waypoints. In particular, the energy management system 100 identifies waypoints 330a-330d to avoid the obstacles 306 along the potential route 322a. To traverse the potential route 322a, the energy management system 100 can determine that the UAV 310 will have to travel to the waypoint 330a (i.e., a point a certain distance from the obstacles 306) ascend to the waypoint 330b (i.e., a point a certain distance above the obstacles 306), travel to the waypoint 330c, and descend to the waypoint 330d before traveling to and landing at the landing station 308.

The energy management system 100 can calculate a measure of landing energy (e.g., an amount of time or an amount of power) required to traverse the potential route 322a, including the waypoints 330a-330d. For example, based on flight speed, ascending speed, and descending speed of the UAV 310, the energy management system 100 can calculate the amount of time to traverse the waypoints 330a-330d and land at the landing station 308.

The energy management system 100 can calculate a measure of landing energy (e.g., an amount of time, an amount of power, or another measure) required to traverse a route utilizing a variety of techniques. For example, in one or more embodiments, the energy management system 100 accesses an operating profile associated with the UAV 310 to determine the flight speed, ascending speed, descending speed, or other operating characteristics with regard to the UAV 310. The energy management system 100 can utilize these average operating characteristics from the operating profile to calculate an amount of time to traverse the potential routes 322a, 322b.

Moreover, the energy management system 100 can also calculate an amount of time to traverse a route based on an amount of time taken to fly a portion of the mission plan 304. For example, the energy management system 100 can monitor the amount of time taken to fly a distance (i.e., time to travel from a starting point to a current position within the mission plan 304). Similarly, the energy management system 100 can monitor the amount of time to ascend or descend while flying the mission plan 304. The energy management system 100 can utilize these metrics (e.g., time and distance) to calculate a flying rate, an ascending rate, descending rate, or other operating characteristics with regard to the UAV 310 during flight of the mission plan 304. Moreover, the energy management system 100 can utilize the flying rate, ascending rate, descending rate, or other operating characteristics with regard to the UAV 310 during flight of the mission plan 304 to estimate the amount of time to traverse the potential routes 322a, 322b (e.g., the waypoints 330a-330d).

Similarly, the energy management system 100 can also calculate an amount of power required to traverse the potential routes 322a, 322b. For example, in one or more embodiments, the energy management system 100 can access an operating profile of the UAV 310 to determine the amount of power required to fly a particular distance, ascend to a particular elevation, descend to a particular elevation, or perform some other navigation operation. The energy management system 100 can then utilize operating profile to calculate the amount of power required to traverse the potential routes 322a, 322b (e.g., traverse the waypoints 330a-330d).

In addition, the energy management system 100 can also calculate an amount of power required to traverse the potential routes 322a, 322b by monitoring the amount of energy required to traverse some portion of the mission plan 304. For example, the energy management system 100 can calculate a power discharge rate with regard to a battery during flight of the mission plan 304. More particularly, the energy management system 100 can monitor the amount of power utilized to fly a particular distance within the mission plan and to change altitude within the mission plan. The energy management system 100 can then utilize these metrics to calculate one or more discharge rates with regard to the mission plan 304 (e.g., a flight discharge rate with regard to the mission plan 304, an ascending discharge rate with regard to the mission plan 304, or a descending discharge rate with regard to the mission plan 304). The energy management system 100 can then utilize the one or more discharge rates with regard to the mission plan 304 to estimate the power required to travel the potential routes 322a, 322b (e.g., traverse the waypoints 330a-330d). In this manner, the energy management system 100 can determine a measure of landing energy (e.g., the amount of time, power, or other measure required to travel to the landing station 308).

As discussed with regard to estimating a measure of remaining energy, the energy management system 100 can also account for environmental conditions in calculating a measure of landing energy. For example, as discussed previously, the energy management system 100 can account for wind, temperature, air pressure, humidity, and other environmental factors that affect flight of a UAV in calculating a measure of landing energy. Thus, for example, the energy management system 100 can determine a temperature and determine a discharge rate with regard to the temperature and determine a wind speed and direction and determine a measure of energy attributable to the wind speed and direction. The energy management system 100 can then calculate a measure of landing energy for a route based on the detected environmental factors.

Moreover, in one or more embodiments, the energy management system 100 compares potential routes. In particular, the energy management system 100 can compare an amount of landing energy required to traverse different potential routes.

For example, upon determining the measure of landing energy required to traverse the potential routes 322a, 322b, the energy management system 100 can determine that the measure of landing energy required to traverse the potential route 322b is less than the measure of landing energy required to traverse the potential route 322a. Accordingly, the energy management system 100 can determine that the potential route 322b is the preferred route with regard to the potential transition point 320.

In addition to the potential transition point 320, the energy management system 100 can also identify other potential transition points (and other potential routes). Moreover, the energy management system 100 can compare potential transition points (and potential routes).

Figure 3D:
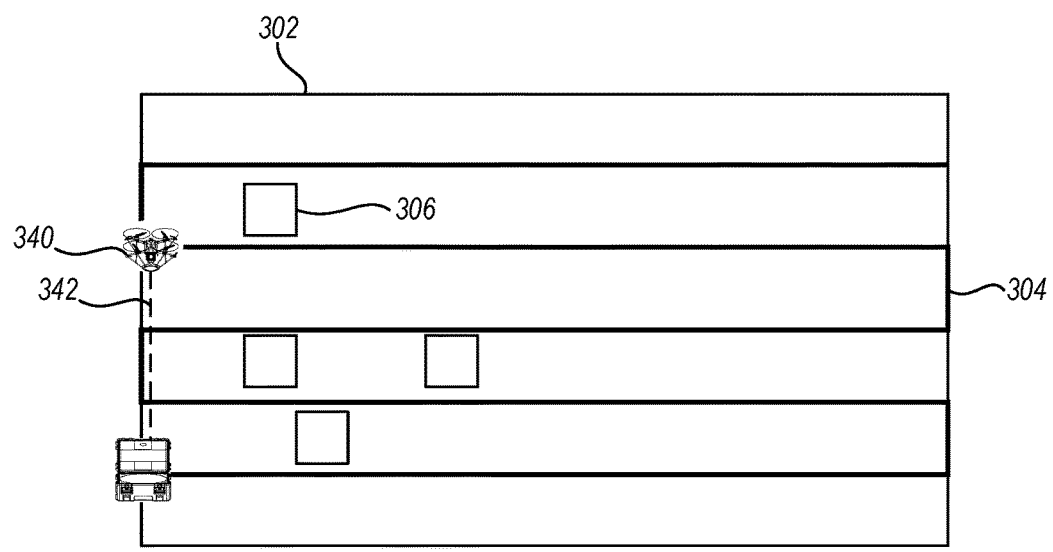
FIG. 3D illustrates a representation of another potential transition point and potential route for returning to the landing station of FIG. 3A in accordance with one or more embodiments.

For example, FIG. 3D illustrates the energy management system 100 identifying a second potential transition point 340 and a second potential route 342. Specifically, the energy management system 100 identifies the second potential transition point 340 at the end of flight light 304g and the second potential route 342 as the route with the lowest measure of landing energy between the second potential transition point 340 and the landing station 308. As described above, the energy management system 100 determines a measure of landing energy (e.g., time, power, or some other measure) required to traverse the second potential route 342.

The energy management system 100, can select a transition point and route by comparing potential transition points and/or potential routes. In particular, in one or more embodiments, the energy management system 100 selects a transition point and route by comparing the amount of landing energy required to traverse potential routes. For example, the energy management system 100 can compare the measure of landing energy required to traverse the potential route 322b and the measure of energy required to traverse the second potential route 342. Based on the comparison, the energy management system 100 can determine that the measure of energy required to traverse the second potential route 342 is less than the measure of energy required to traverse the potential route 322b. Accordingly, the energy management system 100 can select the second transition point 340 and the second route 342 and modify the mission plan 304 based on the second transition point 340 and the second route 342 (e.g., modify the mission plan 304 to include the second route 342).

The energy management system 100 can select a route based on a variety of characteristics. For example, the energy management system 100 can select a route that results in the shortest distance, the shortest time, or the least amount of power required to traverse the route.

In addition to a measure of landing energy, the energy management system 100 also considers a measure of remaining energy in selecting a transition point and/or route. For example, in order to avoid exhausting energy before returning to the landing station 308 (or in order to avoid returning to the landing station 308 with excessive energy), the energy management system 100 also considers a measure of remaining energy with regard to the UAV 310 in selecting a route.

For example, the energy management system 100 can compare a measure of remaining energy with a measure of landing energy in selecting a transition point and/or route. For instance, with regard to FIGS. 5B, 5D, the energy management system 100 can compare the measure of remaining energy and the measure of landing energy with regard to the UAV 310 at the potential transition point 320 and the measure of remaining energy and the measure of landing energy with regard to the UAV 310 at the second potential transition point 340. If the energy management system 100 determines that the measure of remaining energy is less than the measure of landing energy, the energy management system 100 can discard the potential transition point. More specifically, if the energy management system 100 determines that the measure of remaining energy with regard to the UAV 310 at the second potential transition point 340 is less than the measure of landing energy to traverse the second potential route 342, the energy management system 100 will disregard the second potential transition point 340 and the second potential route 342.

Similarly, if the energy management system 100 determines that the measure of remaining energy with regard to the UAV 310 at potential transition point 320 is significantly larger than the measure of landing energy to traverse the potential route 322b, the energy management system 100 can disregard the potential transition point 320 and the potential route 322b. For example, in one or more embodiments, the energy management system 100 compares the difference between a measure of remaining energy and a measure of landing energy to one or more thresholds. If the difference between the measure of remaining energy and the measure of landing energy with regard to a potential transition point as greater than the threshold, the energy management system 100 disregards the potential transition point.

In one or more embodiments, the energy management system 100 selects a transition point by forecasting a measure of remaining energy and a measure of landing energy at a future point in a mission plan. In particular, the energy management system 100 can forecast a measure of remaining energy and a measure of landing energy to select a transition point that minimizes the amount of remaining energy upon landing, that minimizes the diversion time (i.e., a measure of landing energy required to traverse a route to a landing station), and that ensures that the measure of remaining energy exceeds the measure of landing energy.

For example, FIG. 4A illustrates a graph 400 that estimates (i.e., forecasts) a measure of remaining energy 402 and a measure of landing energy 404 with regard to position over the course of a mission plan (i.e., the measure of landing energy with regard to potential transition points along the mission plan). As shown, with regard to the embodiment of FIG. 4A, the energy management system 100 estimates the measure of remaining energy 402 to gradually decline as the mission plan progresses. Moreover, as illustrated, the energy management system 100 calculates the measure of landing energy 404 and determines that the measure of landing energy 404 will fluctuate as the UAV executes the mission plan (i.e., the measure of landing energy fluctuates as the UAV travels further away from, nearer to, or around obstacles in flying the mission plan).

The energy management system 100 calculates the measure of remaining energy 402 and the measure of landing energy 404 as described previously. In particular, the energy management system 100 estimates the measure of remaining energy 402 while taking into consideration (i.e., estimating, measuring, or calculating) environmental factors, changes in elevation, changes in altitude, and other navigation operations required for a mission plan. The energy management system 100 also accounts for the particular operation of a UAV and a battery providing power to the UAV during (e.g., discharge rate or battery life-cycle). Similarly, the energy management system 100 estimates the measure of landing energy 404 while taking into consideration operation of the battery, obstacles, environmental conditions, changes in altitude, and other navigation operations with regard to potential routes from potential transition points along the mission plan.

In one or more embodiments, the energy management system 100 utilizes forecasted measures of remaining energy and landing energy to select transition points and routes to a landing station. In particular, in one or more embodiments, the energy management system 100 identifies a point where measures of remaining energy and measure of landing energy intersect, and select transition points based on the identified intersection.

For example, as shown in FIG. 4A, in one or more embodiments, the energy management system 100 identifies an intersection 406 of the measure of remaining energy 402 and the measure of landing energy 404. In particular, the intersection 406 of the measure of remaining energy 402 and the measure of landing energy 404 indicates a position along the mission plan where the measure of remaining energy 402 equals the measure of landing energy 404 (i.e., the UAV can land from the transition point with no energy remaining). Accordingly, with regard to the embodiment of FIG. 4A, the energy management system 100 identifies the position in the mission plan corresponding to the intersection 406 as the transition point.

Indeed, upon identifying the intersection 406 as the transition point, the energy management system 100 can utilize the transition point to travel to the landing station. Specifically, the energy management system 100 can identify a route corresponding to the transition point and traverse the route back to the landing station. In this manner, the energy management system 100 can minimize the measure of remaining energy upon returning to the landing station. Moreover, the energy management system 100 can maximize the energy utilized to fly the mission plan without diverting to land (e.g., recharge). Correspondingly, the energy management system 100 can minimize the number of times the UAV has to stop to obtain additional energy.

Although the intersection 406 minimizes the measure of remaining energy 402 in selecting a transition point, the measure of landing energy 404 is not minimized. Accordingly, selecting a transition point at the intersection 406 can result in a route to the landing station that is larger than other adjacent routes. In one or more embodiments, the energy management system 100 identifies transition points that not only reduce the measure of remaining energy upon landing, but also reduce the time, energy, or power utilized to divert from an existing mission plan and travel to a landing station.

In particular, in one or more embodiments, the energy management system 100 identifies a transition point that minimizes the measure of landing energy (e.g., flight time) required to travel to the landing station. More specifically, in one or more embodiments, the energy management system 100 minimizes the measure of landing energy by identifying a transition point that corresponds to a local minimum in the measure of landing energy 404. For example, with regard to FIG. 4A, the energy management system 100 can identify a local minimum 408 in the measure of landing energy 404. In particular, the energy management system 100 identifies the local minimum 408 as the local minimum in the measure of landing energy 404 that immediately precedes the intersection 406. Thus, the local minimum 408 reflects the transition point in the mission plan that requires the least measure of landing energy to travel to the landing station while also being nearest to the position in the mission plan where the remaining battery time will be completely exhausted. By identifying a local minimum preceding an intersection of a measure of remaining energy and a measure of landing energy, the energy management system 100 can reduce the amount of time, power, and/or energy required to travel from a mission plan travel to a landing station, while also reducing the number of diversionary trips to the landing station.

Moreover, in one or more embodiments, the energy management system 100 identifies a transition point while avoiding unnecessary breaks in flight legs. For example, the energy management system 100 can select a transition point that is at the beginning or the end of a flight leg so as to avoid detouring in the middle of a flight leg to travel to a landing station. Thus, in one or more embodiments, the energy management system 100 identifies the intersection 406 and the corresponding transition point while flying a first flight leg of a mission plan. The energy management system 100 determines that the transition point will occur within a second flight leg of the mission plan. Accordingly, to avoid breaking up the second flight leg, the energy management system 100 modifies the transition point so that it occurs at the beginning of the second flight leg.

As mentioned previously, in one or more embodiments, the energy management system 100 also applies one or more safety factors. Indeed, to avoid running out of power prior to coming to a rest at a landing station, the energy management system 100 can apply a safety factor that ensures that the battery will have a measure of energy upon landing at a landing station. For example, as illustrated in FIG. 4B, the energy management system 100 applies a safety factor 410 by offsetting the measure of remaining energy 402 to generate an adjusted remaining energy 412.

The energy management system 100 utilizes the adjusted remaining energy 412 to identify a transition point that allows for additional energy to travel to the landing station. In particular, in one or more embodiments, the energy management system 100 identifies a safety intersection 414 between the adjusted remaining energy 412 and the measure of landing energy 404. Moreover, the energy management system 100 identifies a transition point that corresponds to the safety intersection 414. As shown, this approach results in a transition point at a slightly earlier position in the mission plan than identified without the safety factor 410.

Moreover, as described with regard to FIG. 4A, the energy management system 100 can also identify transition points based on the safety intersection 414. For example, the energy management system 100 can identify a transition point corresponding to a localized minimum in the measure of landing energy preceding the safety intersection 414. Similarly, the energy management system 100 can identify a transition point that avoids breaking up one or more flight legs.

It will be appreciated that although the safety factor 410 is illustrated as a particular measure of energy with regard to FIG. 4B, the energy management system 100 can apply a different safety factor. For example, upon identifying the intersection 406, in one or more embodiments, the energy management system 100 applies a safety factor that comprises a distance or a number of minutes. For example, the energy management system 100 can apply a safety factor such that the UAV will define a transition point a predetermine number of minutes (e.g., 5 minutes) prior to reaching the intersection 406. Similarly, the energy management system 100 can apply a safety factor such that the UAV will define a transition point a predetermined distance (e.g., 400 m) prior to reaching the intersection 406.

Moreover, in addition to applying the safety factor 410 to generate the adjusted remaining energy 412, the energy management system 100 can also apply the safety factor 410 as an adjustment to the measure of landing energy 404. For example, the energy management system 100 can add a safety factor to the measure of landing energy 404 to ensure that a UAV has some additional energy in traveling to a landing station.

The energy management system 100 can identify a safety factor magnitude based on a variety of factors or conditions. For example, in one or more embodiments, the energy management system 100 varies the magnitude of the safety factor based on detected environmental factors. For instance, if the energy management system 100 detects high winds, the energy management system 100 can increase the safety factor to account for possible changes in wind speed and/or wind direction.

In addition to environmental factors, the energy management system 100 can also identify a safety factor magnitude based on one or more characteristics of the battery (e.g., increase the safety factor as the battery ages), based on one or more characteristics of a UAV (e.g., a larger UAV that can cause additional damage can have a higher safety factor or a more expensive UAV can have a higher safety factor), based on one or more characteristics of a target site (e.g., a sensitive site such as a hospital may require a higher safety factor than an abandoned field), based on time of flight (e.g., a flight at night where fewer people are at the target site may necessitate a lower safety factor than a flight during the day), user input, or some other factor.

In addition to applying a safety factor, in one or more embodiments, the energy management system 100 applies one or more maximum remaining energy thresholds in identifying a transition point. For example, in one or more embodiments, the energy management system 100 will only analyze a potential transition point that corresponds to a measure of remaining energy below a maximum remaining energy threshold. In this manner, the energy management system 100 reduces the number of potential transition points to analyze while also ensuring that the UAV does not return to the landing station with a measure of energy that exceeds the maximum remaining energy threshold.

For example, FIG. 4C illustrates the graph 400 with a maximum remaining energy threshold 420. The maximum remaining energy threshold 420 represents the most remaining energy that can be present in a battery before a UAV will travel back to the landing station. Thus, with regard to the embodiment of FIG. 4C, the energy management system 100 only searches for potential transition points where the measure of remaining energy 402 falls below the maximum remaining energy threshold 420. By only searching for transition points with regard to positions where the measure of remaining energy 402 falls below the maximum remaining energy threshold 420, the energy management system 100 can reduce the resources (time, power, etc.) devoted to analyzing transition points, while also ensuring that the UAV does not return to the landing station with excess energy (i.e., energy above the maximum remaining energy threshold 420).

More specifically, in one or more embodiments, the energy management system 100 identifies a transition point by searching for an intersection between the measure of landing energy 404 and the measure of remaining energy 402 with regard to positions where the measure of remaining energy 402 falls below the maximum remaining energy threshold 420. Thus, the energy management system 100 only analyzes a measure of landing energy with regard to potential positions after a point 422 where the measure of remaining energy 402 crosses the maximum remaining energy threshold 420. In particular, the energy management system 100 identifies the intersection 406 and identifies a transition point corresponding to the intersection 406 after the point 422.

In one or more embodiments, the energy management system 100 identifies a transition point based on the maximum remaining energy threshold 420 and a local minimum in the measure of landing energy 404. For example, the energy management system 100 can select a transition point by searching for a local minimum in a measure of landing energy where a measure of remaining energy falls below the maximum remaining energy threshold 420. In this manner, the energy management system 100 can ensure that the UAV will have sufficient energy to return to the landing station, that the energy management system 100 will not waste energy greater than the maximum remaining energy threshold 420 and will traverse a locally minimized route.

The energy management system 100 can select a maximum remaining energy threshold based on a variety of factors. For example, the energy management system 100 can select a maximum remaining energy threshold based on one or more characteristics of a target site (e.g., the larger the target site, the larger the maximum remaining energy threshold), based on one or more characteristics of a mission plan (e.g., the larger the flight legs, the larger the maximum remaining energy threshold), based on environmental factors (e.g., the larger the wind, the larger maximum remaining energy threshold), based on user input, or some other factor.

In one or more embodiments, the energy management system 100 can also determine if no viable transition points exist below the maximum remaining energy threshold 420. For example, the energy management system 100 can determine that the measure of landing energy 404 always exceeds the measure of remaining energy 402 with regard to potential transition points of the mission plan below the maximum remaining energy threshold 420 (i.e., the UAV does not have sufficient energy to travel back to the landing station). In such circumstances, the energy management system 100 can modify (or discard) the maximum remaining energy threshold to ensure that the UAV can return to a landing station without damage.

It will be appreciated that the energy management system 100 can dynamically modify the measure of remaining energy 402, the measure of landing energy 404, transition points, routes, and/or the mission plan during flight. For instance, the energy management system 100 can determine that a battery associated with a UAV is discharging at a slower (or faster) rate than anticipated and identify a new intersection point between the measure of remaining energy 402 and the measure of landing energy 404. Moreover, the energy management system 100 can identify a new transition point and/or route and modify the mission plan accordingly.

Similarly, the energy management system 100 can detect environmental factors while flying the mission plan that alter the measure of remaining energy 402 and the measure of landing energy 404. The energy management system 100 can dynamically modify the measure of remaining energy 402 and the measure of landing energy 404 in response to changes in environmental factors and dynamically identify a transition point and/or route while flying the mission plan.

The energy management system 100 can dynamically modify measures of energy, transition points, and/or a mission plan based on changes in any type or variety of information. For example, the energy management system 100 can identify changes in obstacles, elevations, altitudes, environmental factors, battery capabilities (e.g., discharge rates), navigation capabilities (e.g., flight speed, ascending speed, descending speed), or any other factor during flight and modify the measure of remaining energy 402 and the measure of landing energy 404 accordingly. Moreover, the energy management system 100 can dynamically calculate a modified position of the intersection 406, a modified transition point, a modified route, and a modified mission plan based on the changes in information.

It will be appreciated that although FIGS. 4A-4C illustrate the measure of remaining energy 402 as a straight line, that the measure of remaining energy 402 can also fluctuate. Indeed, as mentioned previously, a variety of factors can affect a measure of remaining energy during a mission plan, including, for example, a direction of flight, wind speed, wind direction, operation of a battery, or other factors. Moreover, the measure of landing energy 404 can fluctuate during the course of a mission plan based on similar factors. Accordingly, although FIGS. 4A-4C provide a sample illustration of identifying transition points, it will be appreciated that the shape of the measure of remaining energy 402 and the measure of landing energy 404 can vary significantly from embodiment to embodiment and target site to target site.

In addition, it will be appreciated that although FIGS. 4A-4C illustrate the graph 400 with an x-axis reflecting mission plan position, the energy management system 100 can estimate the measure of remaining energy 402 and the measure of landing energy 404 with regard to time rather than position. For example, the energy management system 100 can estimate the measure of remaining energy 402 and the measure of landing energy 404 corresponding to a plurality of future points in time. Moreover, the energy management system 100 can identify the intersection 406 based on a point in time where the measure of landing energy 404 and the measure of remaining energy 402 intersect. Similarly, the energy management system 100 can identify a transition point defined at a particular point in time.

Similarly, it will be appreciated that the measure of remaining energy 402 and the measure of landing energy 404 can comprise any measure of energy. Indeed, as discussed previously, the event generation system 100 can utilize a remaining battery time and landing time; a remaining battery power and landing power; or some other measures of energy to identify intersections, transition points, and/or routes.

As mentioned previously, the energy management system 100 can also perform its functions with regard to multiple landing stations. Indeed, in one or more embodiments, the energy management system 100 can compare a measure of remaining energy with different measures of landing energy corresponding to multiple different landing stations. Moreover, the energy management system 100 can select a route to one of the landing stations based on the comparison.

Figure 5A:
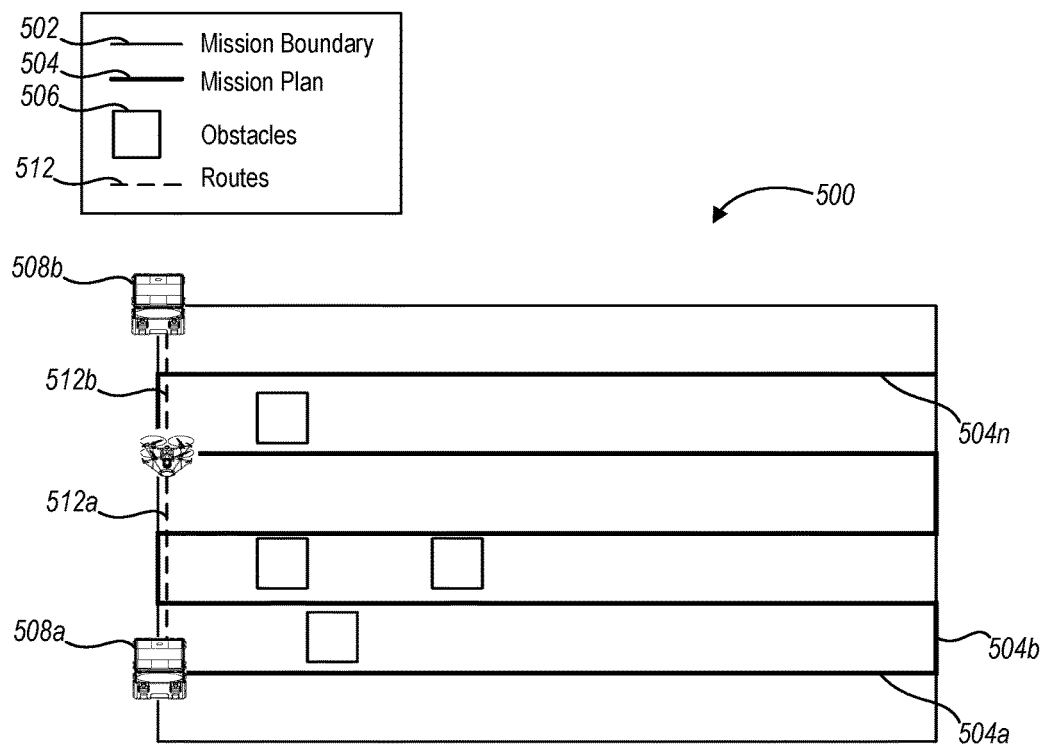
FIG. 5A illustrates a representation of a target site, a mission plan, a UAV, two landing stations, and two potential routes in accordance with one or more embodiments.

For example, FIG. 5A illustrates a target site 500 with a mission boundary 502 which encompasses obstacles 506. The energy management system has generated a mission plan 504 comprising a plurality of flight legs 504a-504n. Moreover, FIG. 5A illustrates a first landing station 508a, a second landing station 508b, and a UAV 510. As shown in FIG. 5A, the UAV 510 can fly the mission plan 504 and determine one or more routes between a potential transition point (e.g., the current location of the UAV 510) and one or more landing stations. In particular, with regard to FIG. 5A, the energy management system 100 identifies a first route 512a to the first landing station 508a and a second route 512b to the second landing station 508b.

The energy management system 100 can compare multiple routes. For example, the energy management system 100 can compare measures of landing energy associated with the routes 512a, 512b and compare the measures of landing energy. In particular, the energy management system 100 can determine that the measure of landing energy associated with the second route 512b is less than the measure of landing energy associated with the first route 512a (e.g., the time to land the UAV 510 at the first landing station 508a is greater than the time to land the UAV at the second landing station 508b).

Figure 5B:
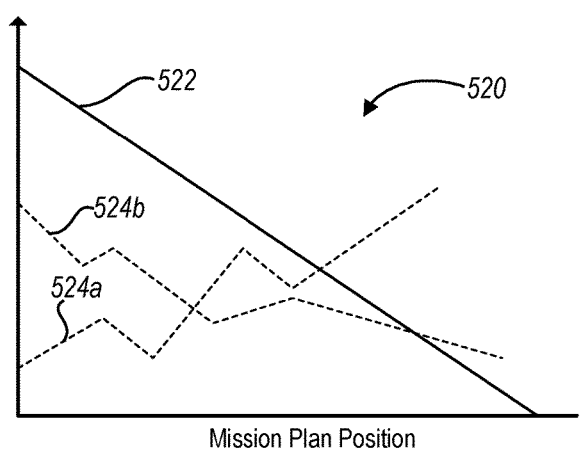
FIG. 5B illustrates a graph of a measure of remaining energy, a measure of landing energy with regard to a first landing station, and a measure of landing energy with regard to a second landing station in accordance with one or more embodiments.

Moreover, the energy management system 100 can forecast a measure of remaining energy and a measure of landing energy with regard to multiple landing stations. For example, FIG. 5B illustrates a graph 520 reflecting, over positions in a mission plan, a measure of remaining energy 522 with regard to a UAV flying a mission plan, a first measure of landing energy 524a with regard to a first landing station, and a second measure of landing energy 524b with regard to a second landing station. In one or more embodiments, the energy management system 100 can select a transition point and/or route by comparing the measure of remaining energy 522, the first measure of landing energy 524a with regard to the first landing station, and the second measure of landing energy 524b with regard to the second landing station.

For example, with regard to FIG. 5B, the energy management system 100 determines that the measure of remaining energy 522 intersects the first measure of landing energy 524a at a first intersection 526a and determines that the measure of remaining energy 522 intersects the second measure of landing energy 524b at a second intersection 526b. The energy management system 100 can select a transition point based on the intersections 526a, 526b. In particular, the energy management system 100 can determine that the second intersection 526b corresponds to a lower measure of remaining energy and a lower measure of landing energy than the first intersection 526a. Accordingly, the energy management system 100 can determine a transition point and route based on the second intersection 526b.

When analyzing multiple routes corresponding to multiple landing stations, the energy management system 100 can select a transition point based on an intersection between a measure of remaining energy and a measure of landing energy utilizing a variety of approaches. Indeed, as described above, the energy management system 100 can apply a safety factor with regard to the second intersection 526b, the energy management system 100 can identify a nearest localized minimum point based on the second intersection 526b, and the energy management system 100 can identify a transition point at the beginning of a flight leg corresponding to the second intersection 526b. Moreover, as described above, the energy management system 100 can identify a transition point by applying a maximum remaining energy threshold.

The energy management system 100 can also dynamically update a transition point with regard to multiple landing stations. For example, the energy management system 100 can select a transition point and route corresponding to a first landing station. Later in a flight, the energy management system 100 can detect changes in environmental factors, discharge rate, or other factors, and dynamically modify a measure of remaining energy and/or a measure of landing energy. Based on the modified measure of remaining energy and/or the modified measure of landing energy, the energy management system 100 can identify a new transition point and new route to a second landing station and modify the mission plan based on the new transition point and the new route.

As mentioned previously, in one or more embodiments, the energy management system 100 can modify a mission plan. In particular, the energy management system 100 can modify a mission plan based on one or more identified transition points and/or routes. For example, the energy management system 100 can modify a mission plan to incorporate a route between a transition point and a landing station. Moreover, the energy management system 100 can modify a mission plan to incorporate a route from a landing station back to a transition point (or to some other point in the mission plan).

In addition to adding a route to (or from) a landing station, the energy management system 100 can further modify a mission plan based on a selected transition point and/or route. For example, upon determining a route to a landing station, the energy management system 100 can determine new orientation or combination of flight legs to traverse a remaining portion of the target site. For example, after determining a route to a landing station, the energy management system 100 can determine that a new combination of flight legs can traverse the remaining portion of the target site in less time and/or distance. Moreover, the energy management system 100 can generate a modified mission plan reflecting the new flight legs. In this manner, the energy management system 100 can further modify a mission plan based on a selected transition point and/or route.

Figure 6:
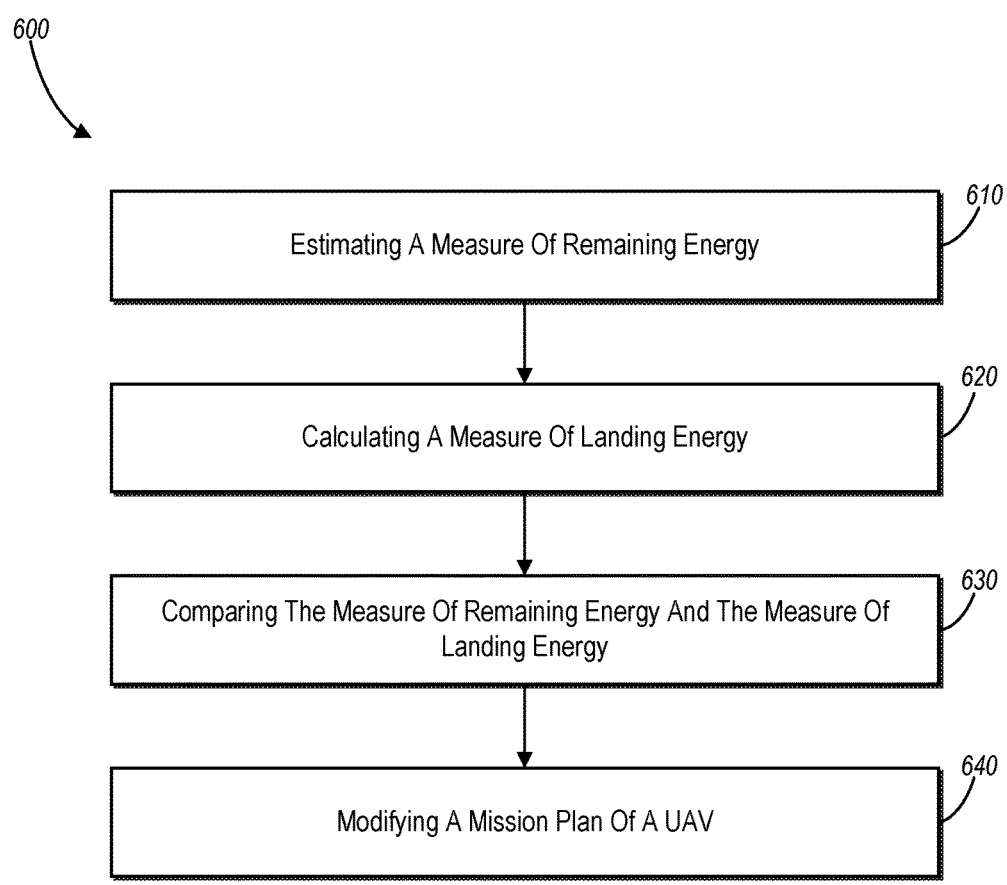
FIG. 6 illustrates a flowchart of a series of acts in a method of generating a mission plan in accordance with one or more embodiments.

FIGS. 1-5B, the corresponding text, and the examples, provide a number of different systems and devices for managing energy with regard to returning a UAV to the ground during a mission plan. In addition to the foregoing, one or more embodiments can also be described in terms of flowcharts comprising acts and steps in a method for accomplishing a particular result. For example, FIG. 6 illustrates flowcharts of exemplary methods in accordance with one or more embodiments. The methods described in relation to FIG. 6 may be performed with less or more steps/acts or the steps/acts may be performed in differing orders. Additionally, the steps/acts described herein may be repeated or performed in parallel with one another or in parallel with different instances of the same or similar steps/acts.

FIG. 6 illustrates a flowchart of one example method 600 of managing energy during flight of a UAV in accordance with one or more embodiments. As illustrated, the method 600 includes an act 610 of estimating a measure of remaining energy. In particular, the act 610 can include estimating, by at least one processor during flight of a mission plan by a UAV, a measure of remaining energy with regard to a battery powering the UAV. For example, the act 610 can include estimating a remaining battery time.

Moreover, the act 610 can include calculating a discharge rate of the battery based on an amount of energy consumed by the UAV in a period of time during the flight of the mission plan; and calculating the remaining battery time based on the calculated discharge rate of the battery. In addition, the act 610 can include determining one or more environmental conditions with regard to the flight of the mission plan; and calculating the remaining battery time based on the one or more environmental conditions. For instance, in one or more embodiments, the one or more environmental conditions comprise at least one of: a temperature, a wind speed, or a wind direction.

In addition, the act 610 can also include calculating an energy consumption rate of the UAV; comparing the energy consumption rate of the UAV to an average energy consumption rate stored in an operating profile; and based on the comparison between the energy consumption rate of the UAV and the average energy consumption rate, estimating the effect of the one or more environmental conditions.

As shown in FIG. 6, the method 600 may also include an act 620 of calculating a measure of landing energy. In particular, the act 620 can include calculating, by the at least one processor, a measure of landing energy, the measure of landing energy reflecting energy needed by the UAV to travel from a position within the mission plan to a landing station. For example, the act 620 can include estimating a travel time between the position within the mission plan and the landing station.

For instance, in one or more embodiments, the act 620 includes determining a route between the position within the mission plan and the landing station; determining changes in altitude along the route between the position within the mission plan and the landing station; and calculating the measure of landing energy based on the route and the changes in altitude. Furthermore, the act 620 can include identifying one or more obstacles between the current position of the UAV and the landing station; and modifying the route or the changes in altitude based on the identified one or more obstacles.

In addition, as shown in FIG. 6, the method 600 may also include an act 630 of comparing the measure of remaining energy and the measure of landing energy. In particular, in one or more embodiments the act 630 comprises comparing the measure of remaining energy and the measure of landing energy and identifying an intersection between the measure of remaining energy and the measure of landing energy. Furthermore, the act 630 can include comparing the measure of remaining energy and determining that the measure of landing energy is greater than (or less than) the measure of landing energy.

In one or more embodiments, the mission plan comprises a plurality of flight legs. Moreover, the act 630 can include determining during a first flight leg a potential transition point based on an intersection between a measure of remaining energy at the potential transition point and a measure of landing energy at the potential transition point; and determining that the potential transition point falls within a second flight leg.

As illustrated in FIG. 6, the method 600 may also include an act 640 of modifying a mission plan of a UAV. In particular, the act 640 may include dynamically modifying, by the at least one processor, the mission plan of the UAV to return the UAV to the landing station, based on the comparison of the measure of remaining energy and the measure of landing energy. For example, in one or more embodiments, the act 640 includes identifying a shortest route between an untraversed portion of the mission plan and the landing station, wherein a measure of landing energy to traverse the shortest route to the landing station is less than the measure of remaining energy; and generating a modified mission plan based on the shortest route. Moreover, in one or more embodiments, the act 640 includes and based on the determination that the potential transition point will occur during the second flight leg, modifying the mission plan to return to the landing station before beginning the second flight leg.

The method 600 may also include calculating, by the at least one processor, a second travel time from the position within the mission plan to a second landing station. Moreover, the method 600 may include comparing the travel time, the second travel time, and the remaining battery time; and based on the comparison between the travel time, the second travel time, and the remaining battery time, modifying the mission plan of the UAV to include a new route to the landing station.

Figure 7:
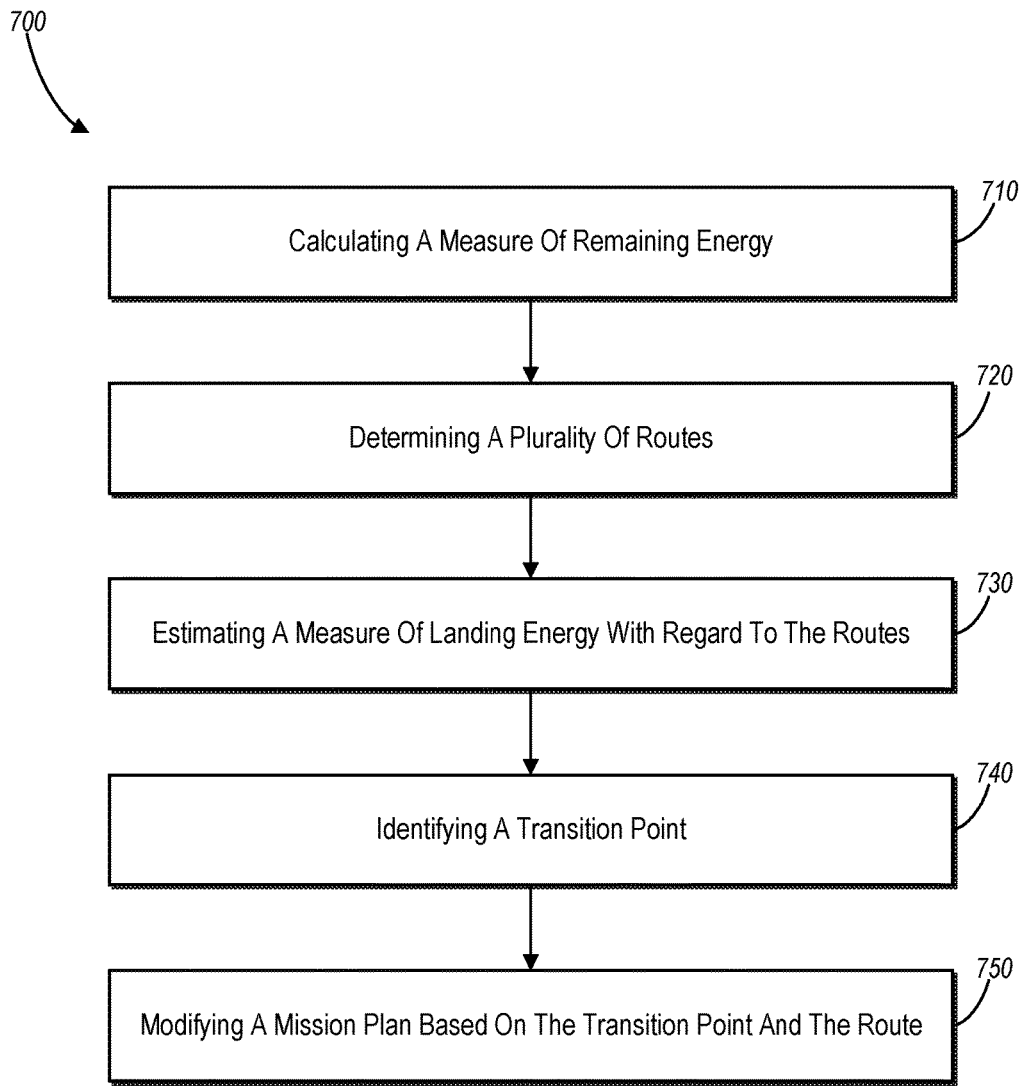
FIG. 7 illustrates a flowchart of a series of acts in another method of generating a mission plan in accordance with one or more embodiments.

FIG. 7 illustrates a flowchart of another example method 700 of managing energy during flight of a UAV in accordance with one or more embodiments. As illustrated, the method 700 includes an act 710 of calculating a measure of remaining energy. In particular, in one or more embodiments, the act 710 includes during flight of a mission plan for a UAV with regard to a target site, the mission plan comprising a plurality of flight legs, dynamically calculating, by the at least one processor, a measure of remaining energy with regard to a battery powering the UAV. For example, in one or more embodiments, the act 710 includes calculating the measure of remaining energy at the potential transition points. Furthermore, the act 710 can include estimating a remaining battery time.

In addition, as shown in FIG. 7, the act 710 can include calculating a discharge rate of the battery based on an amount of energy consumed by the UAV in a period of time during the flight of the mission plan; and calculating the measure of remaining energy based on the calculated discharge rate of the battery. Furthermore, in one or more embodiments, the act 710 includes determining one or more environmental conditions with regard to the flight of the mission plan; and calculating the measure of remaining energy based on the one or more environmental conditions.

As illustrated in FIG. 7, the method 700 also includes an act 720 of determining a plurality of routes. In particular, the act 720 can include determining a plurality of routes between a plurality of potential transition points and a landing station, wherein the plurality of potential transition points comprise positions from the mission plan.

Moreover, as illustrated in FIG. 7, the method 700 also includes an act 730 of estimating a measure of landing energy with regard to the routes. In particular, the act 730 can include estimating a measure of landing energy with regard to each of the plurality of routes. For example, in one or more embodiments the act 730 includes determining one or more environmental conditions with regard to the flight of the UAV; and estimating the measure of landing energy based on the one or more environmental conditions. In addition, the act 730 can include estimating a travel time.

As shown in FIG. 7, the method 700 also include an act 740 of identifying a transition point. In particular, the act 740 can include identifying, by the at least one processor, a transition point from the mission plan and a route from the transition point to the landing station, based on the measure of landing energy with regard to each of the plurality of routes and the measure of remaining energy. For example, in one or more embodiments, the act 740 includes identifying an intersection between the measure of remaining energy and the measure of landing energy corresponding to one of the potential transition points.

Furthermore, as illustrated in FIG. 7, the method 700 also includes an act 750 of modifying a mission plan based on the transition point and the route. For example, in one or more embodiments, the act 750 includes identifying the transition point during a first flight leg; determining that the transition point will occur during a second flight leg; and modifying the transition point such that the transition point occurs prior to the second flight leg.

Moreover, the method 700 can also include estimating an effect of the one or more environmental conditions by: calculating an energy consumption rate of the UAV; comparing the energy consumption rate of the UAV to an average energy consumption rate stored in an operating profile; and based on the comparison between the energy consumption rate of the UAV and the average energy consumption rate, estimating the effect of the one or more environmental conditions.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

FIG. 7 illustrates a block diagram of an exemplary computing device 700 that may be configured to perform one or more of the processes described above. One will appreciate that the energy management system 100 may be implemented by one or more computing devices such as the computing device 700. As shown by FIG. 7, the computing device 700 can comprise a processor 702, memory 704, a storage device 706, an I/O interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7. Components of the computing device 700 shown in FIG. 7 will now be described in additional detail.

In particular embodiments, the processor 702 includes hardware for executing instructions, such as those making up a computer program. As an example and not by way of limitation, to execute instructions, the processor 702 may retrieve (or fetch) the instructions from an internal register, an internal cache, the memory 704, or the storage device 706 and decode and execute them. In particular embodiments, the processor 702 may include one or more internal caches for data, instructions, or addresses. As an example and not by way of limitation, the processor 702 may include one or more instruction caches, one or more data caches, and one or more translation lookaside buffers (TLBs). Instructions in the instruction caches may be copies of instructions in the memory 704 or the storage 706.

The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The storage device 706 includes storage for storing data or instructions. As an example and not by way of limitation, the storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. The storage device 706 may include removable or non-removable (or fixed) media, where appropriate. The storage device 706 may be internal or external to the computing device 700. In particular embodiments, the storage device 706 is non-volatile, solid-state memory. In other embodiments, the storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 708 allows a user to provide input to, receive output from, and otherwise transfer data to and receive data from the computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 712 may include hardware, software, or both that couples components of the computing device 700 to each other. As an example and not by way of limitation, the communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. A computer-implemented method comprising:
   determining, by at least one processor during flight of a mission plan by a UAV, measures of remaining energy with regard to a battery powering the UAV, the measures of remaining energy comprising a first measure of remaining energy corresponding to a first transition point and a second measure of remaining energy corresponding to a second transition point;
   determining, by the at least one processor, measures of landing energy, the measures of landing energy comprising a first measure of landing energy reflecting energy needed by the UAV to travel from the first transition point to a landing station and a second measure of landing energy reflecting energy needed by the UAV to travel from the second transition point to the landing station;
   selecting the first transition point by comparing the first measure of landing energy corresponding to the first transition point and the second measure of landing energy corresponding to the second transition point and by comparing the first measure of remaining energy corresponding to the first transition point and the first measure of landing energy corresponding to the first transition point; and
   dynamically modifying, by the at least one processor, the mission plan of the UAV to return the UAV to the landing station from the first transition point.

2. The method of claim 1, wherein:
   determining the measures of remaining energy comprises determining a remaining battery time; and
   determining the measures of landing energy comprises determining a travel time to the landing station.

3. The method of claim 2, wherein determining the remaining battery time comprises:

determining a discharge rate of the battery based on an amount of energy consumed by the UAV in a period of time during the flight of the mission plan; and determining the remaining battery time based on the discharge rate of the battery and the amount of energy consumed by the UAV in the period of time during the flight of the mission plan.

4. The method of claim 2, wherein determining the remaining battery time comprises:

determining one or more environmental conditions with regard to the flight of the mission plan; and calculating the remaining battery time based on the one or more environmental conditions.

5. The method of claim 4, wherein the one or more environmental conditions comprise at least one of: a temperature, a wind speed, or a wind direction.

6. The method of claim 4, further comprising determining an effect of the one or more environmental conditions by:

calculating an energy consumption rate of the UAV;

comparing the energy consumption rate of the UAV to an average energy consumption rate stored in an operating profile; and based on the comparison between the energy consumption rate of the UAV and the average energy consumption rate, determining the effect of the one or more environmental conditions.

7. The method of claim 1, wherein determining the measures of landing energy comprises:

identifying a first route between the first transition point and the landing station;

identifying a second route between the second transition point and the landing station;

determining the first measure of landing energy based on the first route; and determining the second measure of landing energy based on the second route.

8. The method of claim 7, wherein determining the first measure of landing energy further comprises:

determining changes in altitude along the first route between the first transition point and the landing station; and calculating the first measure of landing energy based on the first route and the changes in altitude.

9. The method of claim 7, wherein selecting the first transition point is further based on comparing the first route and the second route to identify a shortest route.

10. The method of claim 1, wherein the mission plan comprises a plurality of flight legs and further comprising:

determining the second transition point based on an intersection between the measures of remaining energy and the measures of landing energy;

determining that the second transition point falls within a second flight leg; and selecting the first transition point based on the determination that the second transition point falls within the second flight leg.

11. The method of claim 10, further comprising:

determining that the first transition point is before the second flight leg in the mission plan; and based on the determination that the second transition point will occur during the second flight leg and the determination that the first transition point is before the second flight leg in the mission plan, selecting the first transition point and modifying the mission plan to return to the landing station from the first transition point before beginning the second flight leg.

12. A computer-implemented method comprising:

during flight of a mission plan for a UAV with regard to a target site, the mission plan comprising a plurality of flight legs, dynamically determining, by at least one processor, a first measure of remaining energy with regard to a battery powering the UAV corresponding to a first transition point and a second measure of remaining energy corresponding to a second transition point;

identifying a first route between the first transition point and a landing station and a second route between the second transition point and the landing station;

determining a first measure of landing energy with regard to the first route between the first transition point and the landing station and a second measure of landing energy with regard to the second route between the second transition point and the landing station;

selecting, by the at least one processor, the first transition point and the first route based on the first measure of landing energy, the second measure of landing energy, and the first measure of remaining energy; and modifying, by the at least one processor, the mission plan based on the first transition point and the first route.

13. The method of claim 12, further comprising:

identifying the first transition point by identifying an intersection between the measures of remaining energy and measures of landing energy.

14. The method of claim 12, further comprising:

determining that the second transition point will occur during a second flight leg; and selecting the first transition point based on the determination that the second transition point will occur during the second flight leg and a determination that the first transition point occurs prior to the second flight leg.

15. The method of claim 12, wherein determining the first measure of landing energy comprises:

determining one or more environmental conditions with regard to the flight of the UAV; and determining the first measure of landing energy based on the one or more environmental conditions.

16. A system comprising:

at least one processor; and at least one non-transitory computer readable storage medium storing instructions thereon that, when executed by the at least one processor, cause the system to:

during flight of a mission plan for a UAV with regard to a target site, determine a first measure of remaining energy, with regard to a battery powering the UAV, corresponding to a first transition point and a second measure of remaining energy corresponding to a second transition point;

identify a first route between the first transition point and a landing station and a second route between the second transition point and the landing station;

determine a first measure of landing energy with regard to the first route between the first transition point and the landing station and a second measure of landing energy with regard to the second route between the second transition point and the landing station;

select the first transition point and the first route based on the first measure of landing energy, the second measure of landing energy, and the first measure of remaining energy; and modify, by the at least one processor, the mission plan based on the first transition point and the first route.

17. The system of claim 16, further comprising instructions that, when executed by the at least one processor, cause the system to:
determine the first measure of remaining energy by determining a remaining battery time; and
determine the first measure of landing energy by determining a travel time.

18. The system of claim 16, further comprising instructions that, when executed by the at least one processor, cause the system to determine the first measure of remaining energy by:
determining a discharge rate of the battery based on an amount of energy consumed by the UAV in a period of time during the flight of the mission plan; and
determining the first measure of remaining energy based on the discharge rate of the battery and the amount of energy consumed by the UAV in the period of time during the flight of the mission plan.

19. The system of claim 16, further comprising instructions that, when executed by the at least one processor, cause the system to determine the first measure of remaining energy by:
determining one or more environmental conditions with regard to the flight of the mission plan; and
calculating the first measure of remaining energy based on the one or more environmental conditions.

20. The system of claim 19, further comprising instructions that, when executed by the at least one processor, cause the system to estimate determine an effect of the one or more environmental conditions by:
calculating an energy consumption rate of the UAV;
comparing the energy consumption rate of the UAV to an average energy consumption rate stored in an operating profile; and
based on the comparison between the energy consumption rate of the UAV and the average energy consumption rate, determining the effect of the one or more environmental conditions.

* * * * *